(12) United States Patent
Kubo

(10) Patent No.: US 9,298,028 B2
(45) Date of Patent: Mar. 29, 2016

(54) DISPLAY DEVICE AND TELEVISION DEVICE

(71) Applicant: Sharp Kabushiki Kaisha, Osaka-shi, Osaka (JP)

(72) Inventor: Katsuhiro Kubo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 18 days.

(21) Appl. No.: 14/371,470

(22) PCT Filed: Jan. 9, 2013

(86) PCT No.: PCT/JP2013/050162
§ 371 (c)(1),
(2) Date: Jul. 10, 2014

(87) PCT Pub. No.: WO2013/108678
PCT Pub. Date: Jul. 25, 2013

(65) Prior Publication Data
US 2014/0375925 A1 Dec. 25, 2014

(30) Foreign Application Priority Data

Jan. 16, 2012 (JP) .................................. 2012-006121

(51) Int. Cl.
*G02F 1/1333* (2006.01)
*F21V 8/00* (2006.01)
*G02F 1/1335* (2006.01)

(52) U.S. Cl.
CPC ........ *G02F 1/133308* (2013.01); *G02B 6/0088* (2013.01); *G02F 1/1336* (2013.01);
(Continued)

(58) Field of Classification Search
CPC ........ G02F 2001/133328; G02F 2001/133314; G02F 2001/133388; G02F 2001/133322; G02F 1/133; G02F 1/1335; G02F 1/133504; G02F 1/133524; G02F 1/133615; G02F 1/133603–1/133608; G02B 6/0001; G02B 6/0095; G02B 6/0088; G02B 6/0081
See application file for complete search history.

(56) References Cited

U.S. PATENT DOCUMENTS

| 6,611,302 B1 | 8/2003 | Ueda et al. |
| 2005/0094057 A1* | 5/2005 | Lin .................. G02F 1/133308 349/65 |

(Continued)

FOREIGN PATENT DOCUMENTS

| JP | 2001-083901 A | 3/2001 |
| JP | 2002-109929 A | 4/2002 |

(Continued)

OTHER PUBLICATIONS

Official Communication issued in International Patent Application No. PCT/JP2013/050162, mailed on Apr. 2, 2013.

*Primary Examiner* — Anne Hines
*Assistant Examiner* — Jose M Diaz
(74) *Attorney, Agent, or Firm* — Keating & Bennett, LLP

(57) ABSTRACT

A display device 10 according to this invention includes a light source 16, a display panel 11, an optical member 18, and walls 181. The display panel 11 includes a rear surface 11*b* that light from the light source 16 reaches, and a display surface 11*a* that displays an image with using the light reaching the rear surface 11*b*. The optical member 18 has a plate-like shape and includes facing portion 180*a* that faces the rear surface 11*b*. The light from the light source 16 transmits through the optical member 18 so as to exit the optical member 18 from the facing portion 180*a* toward the rear surface 11*b*. The walls 181 rise respective peripheral edge portions of the facing portion 180*a* and surround periphery of the display panel 11.

14 Claims, 12 Drawing Sheets

(52) U.S. Cl.
CPC .... *G02F1/133504* (2013.01); *G02F 1/133512* (2013.01); *G02F 1/133524* (2013.01); *G02F 2001/133322* (2013.01)

(56) References Cited

U.S. PATENT DOCUMENTS

| | | | | |
|---|---|---|---|---|
| 2012/0050634 A1* | 3/2012 | Kim | ...................... | G02F 1/1333 349/58 |
| 2012/0050636 A1* | 3/2012 | Jeong | ................ | G02F 1/133308 349/58 |
| 2014/0240606 A1* | 8/2014 | Tomomasa | ........ | G02F 1/133308 348/725 |
| 2014/0293136 A1* | 10/2014 | Mouri | .................... | G02B 6/009 348/725 |
| 2014/0333844 A1* | 11/2014 | Ito | ............................ | H04N 5/64 348/794 |
| 2015/0015798 A1* | 1/2015 | Masuda | ................. | G02F 1/1333 348/794 |
| 2015/0022753 A1* | 1/2015 | Akatsuka | .......... | G02F 1/133308 349/58 |
| 2015/0219954 A1* | 8/2015 | Kubo | ................. | G02F 1/133308 348/794 |
| 2015/0219960 A1* | 8/2015 | Seo | ................... | G02F 1/133528 349/96 |

FOREIGN PATENT DOCUMENTS

| | | |
|---|---|---|
| JP | 2002-174811 A | 6/2002 |
| JP | 2008-145655 A | 6/2008 |

* cited by examiner

FIG.1
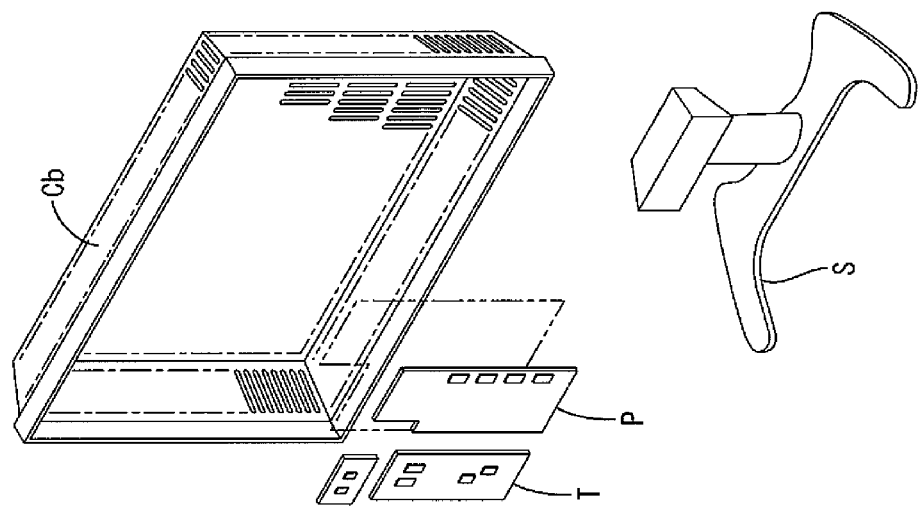
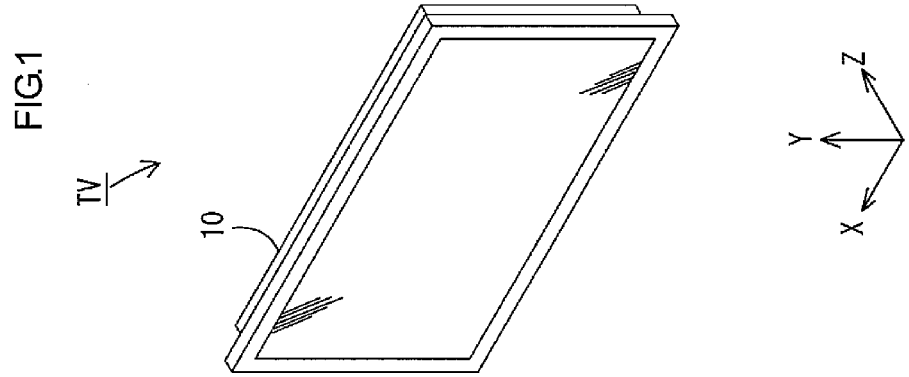
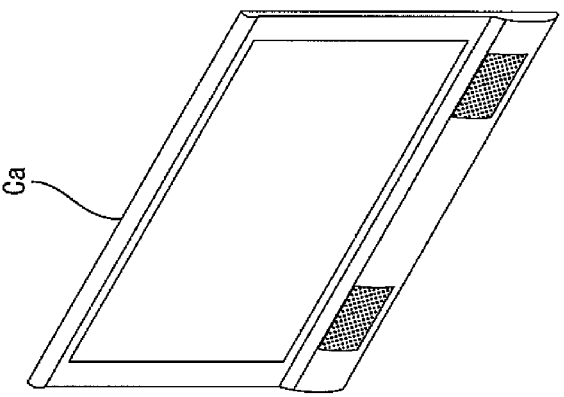

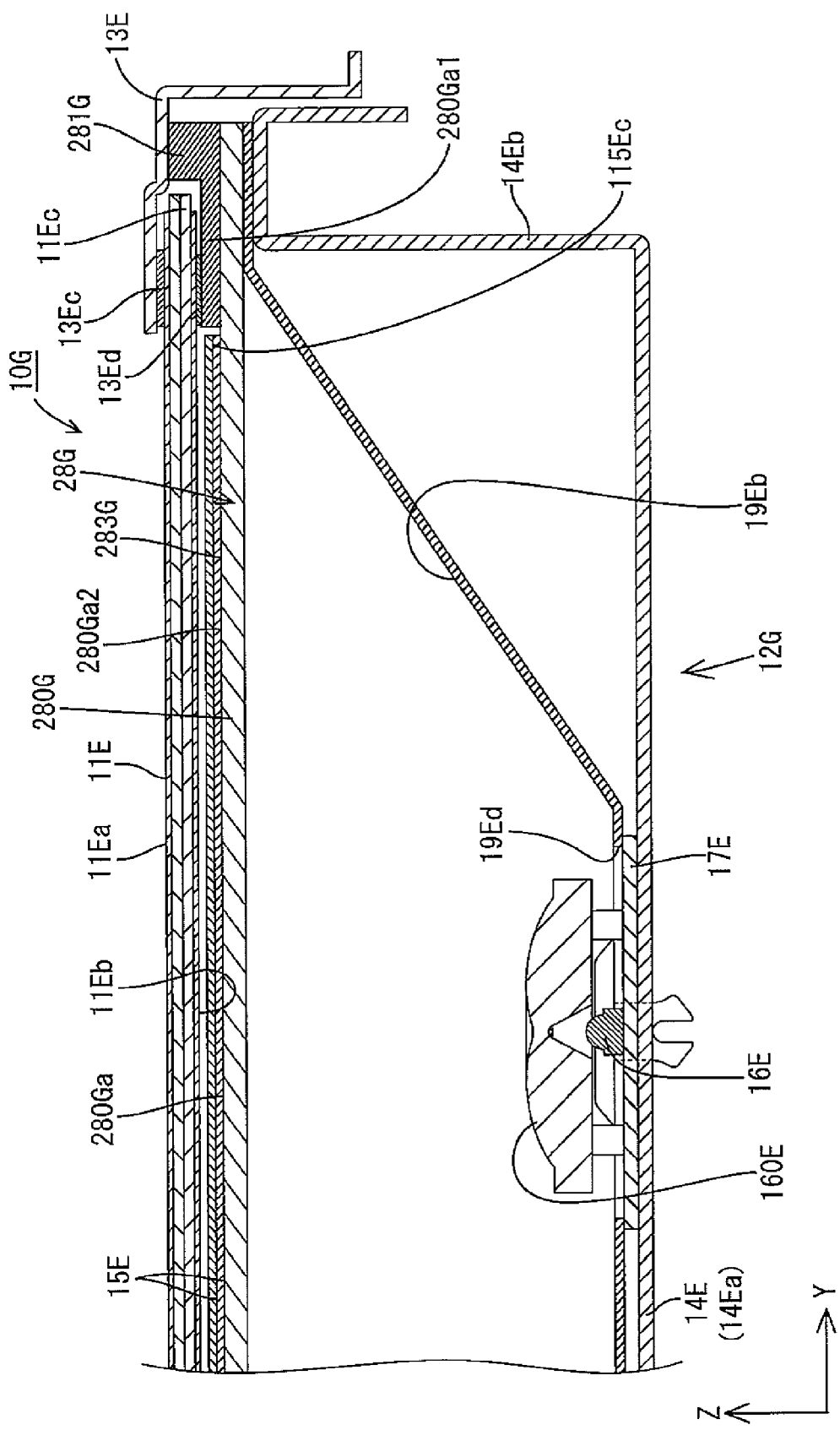

DISPLAY DEVICE AND TELEVISION DEVICE

TECHNICAL FIELD

The present invention relates to a display device and a television device.

BACKGROUND ART

Liquid crystal panels are used display panels that display images in display devices such as television devices, portable phones, or portable information terminals. External light is required to be used to display images on the liquid crystal panels. Therefore, such display devices include the liquid crystal panels and lighting units (backlight units) as disclosed in Patent Document 1. Such a lighting unit is arranged on a back side of the liquid crystal panel and configured to irradiate planar light toward the back surface of the liquid crystal panel.

In the display device, the liquid crystal panel is fixed by a frame as disclosed in Patent Document 1. The frame is a frame member made of metal or resin and supports a peripheral edge portion of the liquid crystal panel with its inner edge portion from the back surface side of the liquid crystal panel. The liquid crystal panel is arranged on a front side of the lighting unit with being fixed by the frame.

RELATED ART DOCUMENT

Patent Document

Patent Document 1: Japanese Unexamined Patent Application Publication No. 2002-174811

Problem to be Solved by the Invention

In the display device, a peripheral portion of the liquid crystal panel (hereinafter, a frame portion) that surrounds the liquid crystal panel has been desired to be smaller. However, as described before, in the display device of the background of art, the position of the liquid crystal panel is fixed by the frame. Therefore, an area of the frame portion increases by an area of the frame and this may be a troublesome. The frame is used in the display device, and this increases the number of parts of the display device or the number of mounting processes.

DISCLOSURE OF THE PRESENT INVENTION

An object of this invention is to provide a display device configured such that an area of a frame portion is reduced.

Means for Solving the Problem

A display device according to the present invention includes a light source, a display panel including a rear surface that light from the light source reaches, and a display surface that is opposite to the rear surface and displays an image using the light reaching the rear surface, an optical member having a plate shape and including a facing portion that faces the rear surface, and through which the light from the light source transmits and which the light exits from the facing portion toward the rear surface, and a wall rising from a peripheral edge portion of the facing portion and surrounding a periphery of the display panel. In such a display device, the display panel and the facing portion of the optical member are positioned by the wall that rises from the peripheral edge portion of the facing portion. In the display device, the display panel is positioned without using an exclusive flame-like member that has been used to position the display panel.

The display device may further include a frame member that faces a peripheral edge portion of the display surface and holds the display panel with the facing portion. In the display device, the frame member faces the peripheral edge portion of the display surface and holds the display panel with the facing portion. In the display device, the display panel is fixed with using the frame member.

The display device may further include an optical sheet arranged between the facing portion and the rear surface and through which the light exiting the facing portion transmits toward the rear surface.

In the display device, the wall may have an inner wall surface on a display panel side, and the display device may further include a light blocking layer that covers the inner wall surface and blocks light. With such a configuration of the display device including the light blocking layer that covers the wall and blocks light, light from the light source is less likely to enter the end portion of the display panel.

In the display device, the walls may be made of a light blocking material that blocks light. With such a configuration of the display device including the wall made of the light blocking material, the light from the light source is less likely to enter the end portion of the display panel.

In the display device, the wall may be formed integrally with the optical member. With such a configuration of the display device including the wall formed integrally with the optical member, the number of parts and steps of assembling the display device is reduced.

In the display device, the facing portion may include a wall-side portion and a recess portion, and the wall-side portion may be provided corresponding to a peripheral edge portion of the rear surface and to surround a periphery of the optical sheet, and the recess portion may be provided on an inner side with respect to the wall-side portion and recessed further in a thickness direction of the optical member with respect to the wall-side portion and houses the optical sheet therein.

In the display device, the recess portion may be set to provide a clearance between the rear surface and the optical sheet. With such a configuration of the recess portion, even if the optical sheet may thermally expand or shrink, deflection is less likely to be caused on the optical sheet.

In the display device, the wall-side portion may be set to provide a clearance between an end portion of the optical sheet and the wall-side portion. With such a configuration of the wall-side portion, even if the optical sheet may thermally expand or shrink and the end portion of the optical sheet may move to an outer side, the end portion of the optical sheet is pushed back by the wall-side portion and deflection is less likely to be caused on the optical sheet.

In the display device, the wall-side portion and the wall may be formed integrally with each other and formed of a light blocking material that blocks light. With such a configuration that the wall-side portion and the wall is formed integrally with each other and formed of a light blocking material that blocks light, the light from the light source is less likely to enter the display panel through the peripheral end portion thereof and less likely to enter the optical sheet through the end portion thereof.

In the display device, the display panel may include a flexible board that extends from an end portion of the display panel toward an outer side, and the wall may have a board insertion portion having a cutout shape to which the flexible board is inserted. With such a configuration that the wall has a board insertion portion having a cutout shape to which the flexible board is inserted, a portion of the display panel to which the flexible board is connected is positioned with using the optical member.

In the lighting device, the light source may be arranged to face an end surface of the optical member, and the optical member may be a light guide plate, and the light from the light source may enter the light guide plate through the end surface and exit the light guide plate from the facing portion.

In the lighting device, the light source may be arranged to face a plate surface of the optical member that is opposite to the facing portion, and the optical member may be a diffuser plate, and the light from the light source may enter the diffuser plate through the plate surface and exit the diffuser plate from the facing portion.

In the display device, the display panel may be a liquid crystal panel including a pair of substrates and liquid crystals that are enclosed between the substrates.

A television device of this invention may include the above display device.

Advantageous Effect of the Invention

The present invention provides a display device configured such that an area of a frame portion is reduced.

BRIEF DESCRIPTION OF THE DRAWINGS

FIG. 1 is an exploded perspective view illustrating a general configuration of a television device according to a first embodiment of this invention.

FIG. 12 is a magnified cross-sectional view of a liquid crystal display device according to an eighth embodiment.

MODE FOR CARRYING OUT THE INVENTION

First Embodiment

A first embodiment of the present invention will be described with reference to FIGS. 1 to 4. In this embodiment, a liquid crystal display device 10 and a television device TV will be explained. X-axes, Y-axes, and Z-axes are in some drawings. Directions indicated by the axes in each drawing correspond to directions indicated by the respective axes in other drawings. An upper side in FIGS. 2 and 3 corresponds to a front-surface side and a lower side in FIGS. 2 and 3 corresponds to a rear-surface side.

FIG. 1 is an exploded perspective view illustrating a general configuration of the television device TV according to the first embodiment. As illustrated in FIG. 1, the television device TV of this embodiment includes the liquid crystal display device (a display device) 10, front and rear cabinets Ca, Cb which sandwich and house the liquid crystal display device 10 therebetween, a power supply P, a tuner T, and a stand S. The stand S holds the liquid crystal display device 10 such that a display surface thereof corresponds to the vertical direction (the Y-axis direction).

Figure 2:
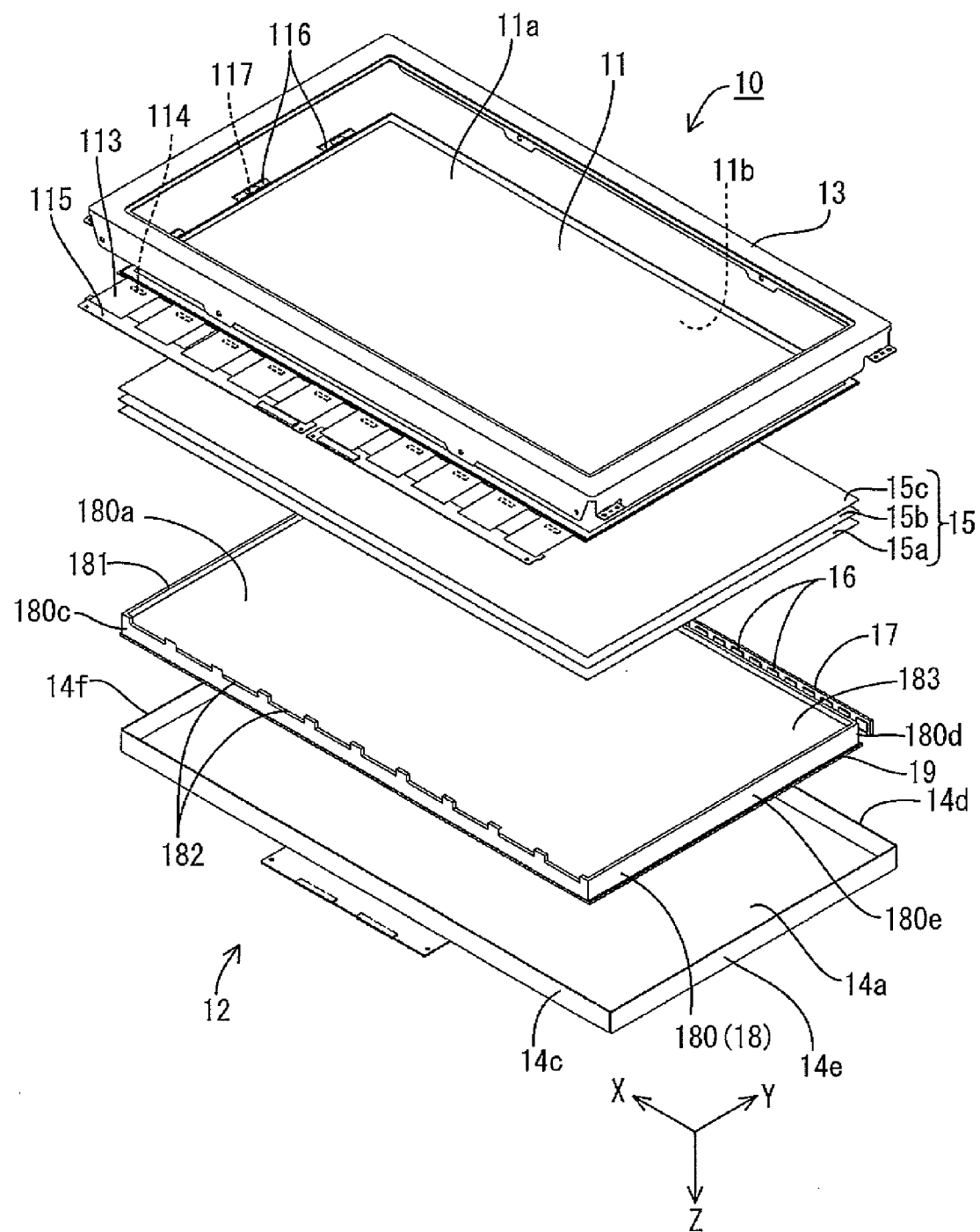
FIG. 2 is an exploded perspective view illustrating a general configuration of a liquid crystal display device.
Figure 3:
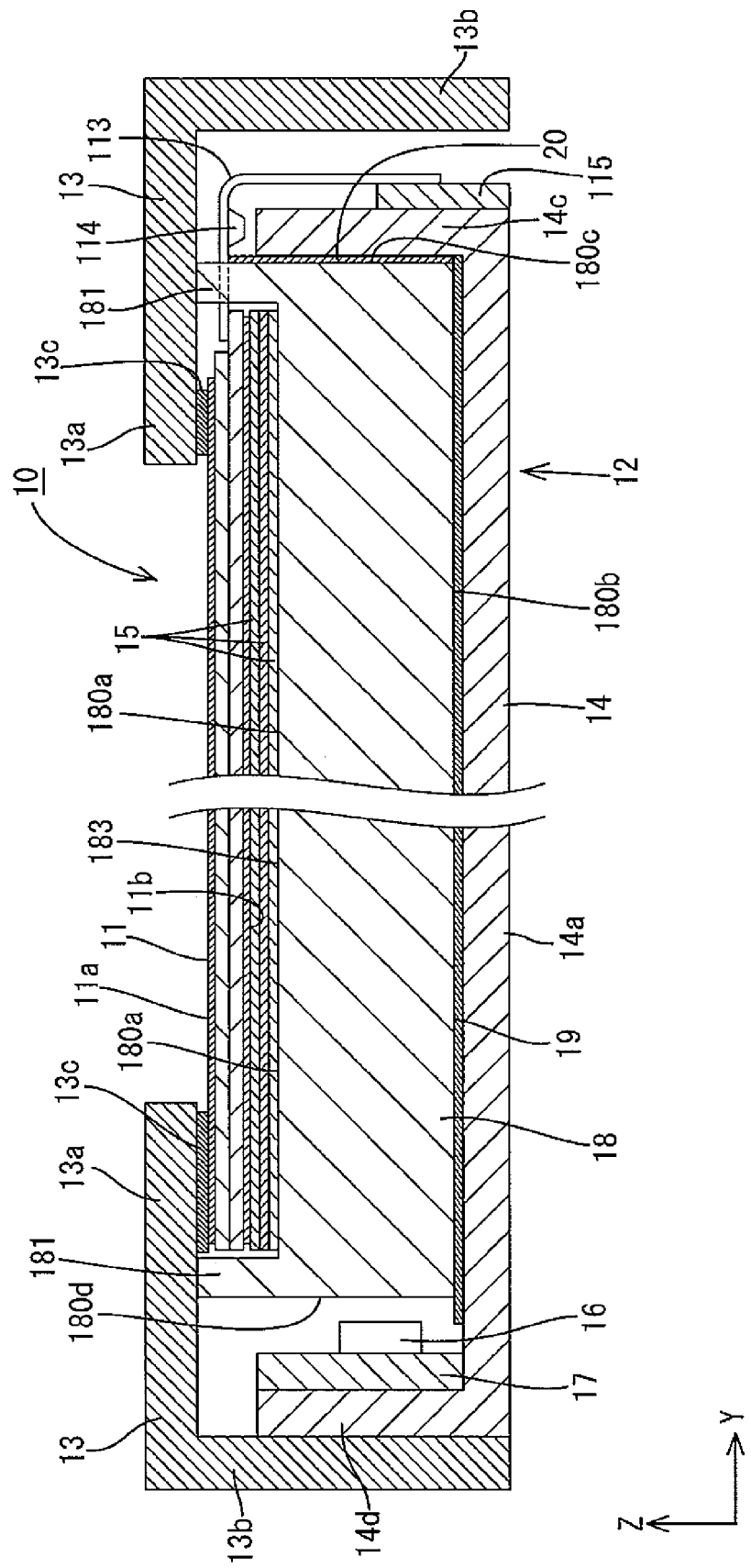
FIG. 3 is a cross-sectional view of the liquid crystal display device taken along a short-side direction thereof illustrating a cross-sectional configuration.
Figure 4:
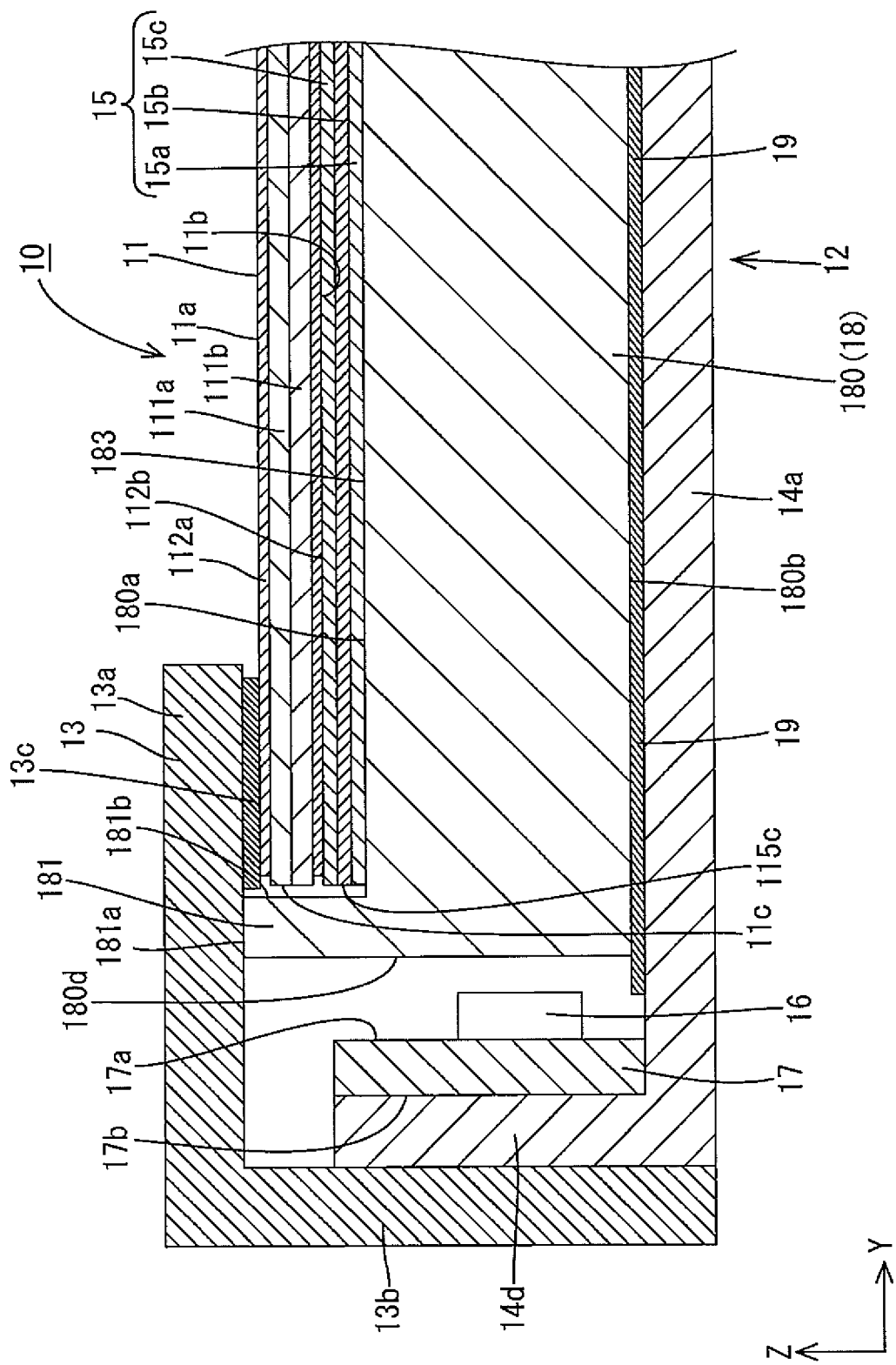
FIG. 4 is a magnified cross-sectional view of the liquid crystal display device illustrated in FIG. 3.

FIG. 2 is an exploded perspective view illustrating a general configuration of the liquid crystal display device 10. FIG. 3 is a cross-sectional view of the liquid crystal display device 10 taken along a short-side direction thereof illustrating a cross-sectional configuration. FIG. 4 is a magnified cross-sectional view of the liquid crystal display device illustrated in FIG. 3. As illustrated in FIG. 2, the liquid crystal display device 10 has an elongated rectangular shape in a plan view from the front side. The liquid crystal display device 10 includes a liquid crystal panel (display panel) 11, a lighting device 12 arranged on a back side of the liquid crystal panel 11 (rear surface 11b), and a frame-like bezel 13. The bezel 13 is arranged on a front side of the liquid crystal panel 11 (display surface 11a). These are held together with the bezel 13 when the bezel 13 is attached to the lighting device 12. The bezel 13 is made of metal.

As illustrated in FIG. 2, the liquid crystal panel 11 has an elongated rectangular shape as a whole when viewed from the front. The liquid crystal panel 11 includes a pair of glass substrates facing each other and a liquid crystal layer enclosed therebetween. One of the glass substrates arranged on the rear surface 11b (back side) is a thin film transistor (TFT) array board 111b. The other glass substrate arranged on the display surface 11a (front side) is a color filter (CF) board 111a.

The TFT array board 111b includes a plurality of thin film transistors as switching elements and a plurality of transparent pixel electrodes connected to drain electrodes of the thin film transistors. The thin film transistors and the transparent pixel electrodes are arranged in a matrix (in row and columns) on a transparent glass substrate. The thin film transistors are provided for pixels, respectively. Each thin film transistor is arranged in a cell defined by the gate lines and source lines on the glass substrate. The pixel electrodes are provided for the pixels, respectively. Each pixel electrode is arranged in a cell defined by the gate lines and source lines on the glass substrate. The gate lines and the source lines intersect each other on the glass substrate. Gate electrodes of the TFT are connected to the gate lines and source electrodes of the TFT are connected to the source lines.

The CF board 111a includes color filters such as red (R), green (G), and blue (B) filters. The color filters are arranged in a matrix on a transparent glass substrate such that the color filters correspond to the pixels on the TFT array board 111b. The color filters are arranged in the respective cells defined by light-blocking black matrices (BM). The black matrix is formed in a grid pattern on the glass substrate. Transparent counter electrodes are arranged on the CFs and the BMs so as to face the pixel electrodes on the TFT array board 111b.

The liquid crystal panel 11 is configured such that a drive circuit board sends image data and control signals necessary for image display to the source lines, gate lines, and the counter electrodes. The liquid crystal panel 11 is controlled using an active matrix. The liquid crystal panel 11 includes polarizing plates 112a and 112b arranged such that a pair of glass substrates 111a and 111b are sandwiched therebetween. The polarizing plate 112a is arranged on the display surface 11a side of the glass substrate 111a. The polarizing plate 112b is arranged on the rear surface 11b side of the glass substrate 111b.

A plurality of flexible wiring boards (flexible printed circuit boards) 113 having flexibility are arranged in one of long edge portions of the liquid crystal panel 11. Each of the flexible wiring boards includes a source driver 114. A terminal (not illustrated) of the TFT array board 11b of the liquid crystal panel 11 is connected to one end of the flexible wiring board 113. The other end of the flexible wiring board 113 is connected to an elongated print board 115. One of short edge side portions of the liquid crystal panel 11 includes a plurality of flexible wiring boards (flexible boards) 116. Each of the flexible wiring boards 116 includes a gate driver 117. In the description of this embodiment, the flexible wiring board 113 including the source driver is longer than the flexible wiring board 116 including the gate driver.

A lighting device 12 is an edge-light type (side-light type). The lighting device 12 includes a chassis 14, an optical sheet set 15, an LED light source (light source) 16, and an LED board (light source board) 17, a light guide plate 18, and a reflection sheet 19.

The chassis 14 has a shallow box-like shape with an opening on an upper side and is formed by pressing a metal plate, such as aluminum-contained material. The chassis 14 includes a bottom plate 14a, a pair of wall plates 14c and 14d, and a pair of wall plates 14e and 14f. The bottom plate 14a has a landscape rectangular shape when viewed from the front. The wall plates 14c and 14d rise from long edges of the bottom plate 14a, respectively. The wall plates 14e and 14f rise from short edges of the bottom plate 14a, respectively. Each of the wall plates 14c, 14d, 14e, 14f rises from the bottom plate 14a.

The reflection sheet 19 has an elongated rectangular shape when viewed from the front and is a white plastic sheet (e.g., a foamed polyethylene terephthalate sheet). The reflection sheet 19 is arranged inside the chassis 14 so as to cover the bottom plate 14a.

The LED light source 16 is a member that includes LED chips, which are light-emitting elements, sealed in a housing with a resin material (so-called an LED package). The LED light source 16 is configured to emit white light. The LED light source 16 includes, for example, three types of LED chips with three different main light emission wavelengths. Specifically, the LED chips are configured to emit light in red (R), green (G), and blue (B), respectively. The LED light source 16 may have a configuration other than the above. For example, the LED light source may have an LED chip configured to emit light in blue (B). The LED chip may be covered with a resin (e.g., silicone resin) in which a phosphor having an emission peak in a red (R) region and a phosphor having an emission peak in a green (G) region are mixed. The LED light source may have an LED chip configured to emit light in blue (B). The LED chip may be covered with a resin (e.g., silicone resin) that contains a phosphor that emits yellow light such as yttrium aluminum garnet (YAG).

As illustrated in FIGS. 2 to 4, the LED board 17 has a plate shape extending along the long-side direction of the chassis 14 (X-axis direction). The LED board 17 is arranged inside the chassis 14 with a front surface 17a thereof along the X-axis and the Z-axis directions. The LED board 17 is arranged between the sideplate 14d and an end surface 180d of the light guide plate 18. The LED board 17 is fixed to the side plate 14d with a screw (not illustrated) with a rear surface 17b thereof in contact with the side plate 14d.

The LED board 17 includes a substrate, an insulating layer, a trace, and a reflection layer. The substrate is made of metal, such as aluminum-contained material, and has an elongated (belt-like) shape. The insulating layer is made of synthetic resin and formed on the substrate. The trace is a metal layer, such as a copper foil, formed on the insulating layer. The reflection layer is a white insulating film formed on the insulating layer so as to cover the trace. In FIG. 3, the board, the insulating layer, the trace, and the reflection layer are integrally illustrated.

Multiple LED light sources 16 are mounted on the front surface 17a of the LED board 17. The LED light sources 16 are arranged in line on the front surface 17a along the long-side direction (X-axis direction) of the LED board 17. The LED light sources 16 have the same shape and are arranged at equal intervals. The LED light sources 16 are connected to each other in series via the trace. An end of the trace on an anode side (a positive side) is located closer to one end of the LED board 17. An end of the trace on a cathode side (a negative side) is located closer to the other end of the LED board 17.

Each of the LED light sources 16 on the front surface 17a has an outer appearance shape of a substantially rectangular parallelepiped shape. The setting including the number of the LED light sources 16 on the LED board 17 and the intervals between the LED light sources 16 can be altered as appropriate.

Two connectors (not illustrated) are mounted on the front surface 17a of the LED board 17. The connectors are configured to relay power supply (electrical current) to each LED light source 16. The connectors are arranged on ends of the LED board 17 with respect to the long side direction of the LED board 17, respectively. Each of the connectors includes a housing (not illustrated) made of synthetic resin having insulating properties and a metal piece of a terminal (not illustrated) arranged inside the housing. The housing has a substantially rectangular parallelepiped shape with an opening on one side. A mating connector (not illustrated) is fitted in the opening.

In the description of this embodiment, one of the connectors is a power source-side connector. The metal piece of the terminal included in the connector is connected to the end of the trace on the anode side. An external drive control circuit (not illustrated) is connected to the metal piece of the terminal via the mating connector (not illustrated). The external drive control circuit is for supplying power and control signals required for turning on the LED light sources 16. The other connector is a ground-side connector. A rear end of the metal piece of the terminal included in the connector is connected to the end of the trace on the cathode side. The metal piece of the terminal included in the connector is grounded via another mating connector (not illustrated).

As illustrated in FIGS. 2 to 4, the light guide plate (optical member) 18 has an landscape rectangular shape as a whole in a plan view, similar to the liquid crystal panel 11 and the chassis 14. The light guide plate 18 has a predetermined thickness. The light guide plate 18 is made of a substantially transparent synthetic resin material having a higher refractive index than the air (e.g., acrylic resin, such as PMMA, or polycarbonate). The light guide plate 18 includes a body 180 and walls 181 rising from the body 180. In the description of this embodiment, the body 180 and the walls 181 are formed integrally and made of the same material. The light guide plate 18 with this configuration is produced by cutting a raw material of the optical member in a plate shape into a predetermined shape, by injection molding with a specific metal die, or by an appropriate method.

The body 180 has a plate shape with predetermined thickness. The body includes a front surface 180a, a rear surface 180b, long-side end surfaces 180c and 180d, and short-side end surfaces 180e and 180f. The surfaces of the body 180 may be referred to as surfaces of the light guide plate 18, respectively. The walls 181 rise from an outer peripheral portion of the front surface 180a of the body 180a. A recess defined by the walls 181 and the front surface 180a is provided on the front surface side of the light guide plate 18. A space defined by the walls 181 and the front surface 180a may be referred to as a recess 183.

The light guides plate 18 is arranged inside the chassis 14 such that the rear surface 180b thereof faces toward the bottom plate 14a with the reflection sheet 19 therebetween. In the chassis 14, one of the long-side end surfaces of the light guide plate 18, that is an end surface 180c, is arranged on the wall plate 14c side and the other one of the long-side end surfaces of the light guide plate 18, that is an end surface 180d, is arranged on the wall plate 14d side. A side refection sheet 20 is arranged between the end surface 180c and the wall plate 14c. The end surface 180d of the light guide plate 18 faces the LED 16 on the LED board 17 with a predetermined space therebetween. In the chassis 14, a short-side end surface 180e is located on the wall plate 14e side and a short-side end surface 180f is located on the wall plate 14f side.

The end surface 180d of the light guide plate 18 is a light entrance surface through which light from the LED source 16 enters. The front surface (a front surface of the body 180) 180a of the light guide plate 18 is a light exit surface. The light that travels from the end surface (the light entrance surface) 180d exits through the front surface 180a toward the optical sheet set 15 and the liquid crystal panel 11, which are arranged over the light guide plate 18. The rear surface (the rear surface of the body 180) 180b of the light guide plate 18 is covered with the reflection sheet 19. The refection sheet 19 reflects the light that enters through the end surface (the light entrance surface) 180d and travels within the light guide plate 18 and directs the light toward the front surface (the light exit surface) 180a.

The rear surface 180b of the light guide plate 18 has a reflecting portion (not illustrated) or a scattering portion (not illustrated). The reflecting portion or the scattering portion is configured to reflect or scatter light inside the light guide plate 18 by patterning such that the light exhibits a predetermined in-plane distribution. With this configuration, the distribution of the light that exits from the front surface (the light exit surface) 180a is adjusted such that the light exhibits a uniform in-plane distribution.

As illustrated in FIG. 2, the optical sheet set 15 has a landscape rectangular parallelepiped plan-view shape similar to the liquid crystal panel 11 when viewed from the front. The light exiting from the light guide plate 18 through the light exit surface 180a transmits through the optical sheet set 15 toward the rear surface 11b of the liquid crystal panel 11. When the light exiting the light guide plate 18 through the light exit surface 180a transmits through the optical sheet set 15, the light is optically affected by the optical sheet set 15 (for example, diffused or collected). In the description of this embodiment, the optical sheet set 15 includes three kinds of sheets of a diffuser sheet 15a, a lens sheet 15b, and a reflection-type polarizing sheet 15c. The sheets are overlaid with each other. The optical sheet set 15 is arranged on the plate surface 180a so as to cover the front plate surface 180a of the light guide plate 18 (a front side plate surface of the body 180). The optical sheet set 15 is arranged in a recessed portion (a recess 183) defined by the front plate surface 180a of the body 180 of the light guide plate 18 and the walls 181. A size of the optical sheet set 15 is set to be slightly smaller than a size of the plate surface 180a surrounded by the walls 181. A small space (clearance) is provided between an inner wall surface 181b of the wall 181 and an end portion 115c of the optical sheet set 15.

The liquid crystal panel 11 is arranged in the recess 183 that is provided on the front side of the light guide plate 18. The liquid crystal panel 11 is arranged in the recess 183 so as to be positioned with respect to the light guide plate 18. In the recess 183, the liquid crystal panel 11 is arranged on the front plate surface of the body 180 of the light guide plate 18 via the optical sheet set 15. The liquid crystal panel 11 is arranged in the recess 183 such that the rear surface 11b thereof faces the plate surface 180a of the light guide plate 18. The plate surface 180a of the light guide plate 18 (the body 180) corresponds to a facing portion (a facing surface) that faces the rear surface 11b of the liquid crystal panel 11.

The liquid crystal panel 11 is surrounded by the walls 181 at its peripheral edges. A small space (clearance) is provided between the inner wall surface 181b of the wall 181 and a peripheral edge (an end portion) 11c of the liquid crystal panel 11. The walls 181 form a frame-like shape as a whole that follows a peripheral edge 11c of the liquid crystal panel 11. As illustrated in FIG. 2, the walls 181 form a rectangular parallelepiped shape as a whole similar to the liquid crystal panel 11. The wall 181 provided on an opposite side from the one facing the LED light sources 16 (that is the wall 181 on the wall plate 14c side) has cutout portions 182. Each flexible wiring board 113 having the source driver included in the liquid crystal panel 11 is inserted to each of the cutout portions 182 (a board insertion portion). The flexible wiring board 113 that extends outwardly from the light guide plate 18 through the board insertion portion 182 extends outside the side plate 14c of the chassis 14. A height dimension of the wall 181 from the plate surface 180a is set to be greater than a thickness dimension of the overlaid optical sheet set 15 and the liquid crystal panel 11. In the description of this embodiment, the height dimension of the wall 181 is set to be smaller than a thickness dimension of the body 180.

The bezel 13 includes frame portions 13a and wall portions 13b. The frame portions 13a face respective peripheral edge portions of the liquid crystal panel 11. The wall portions 13b extend downwardly (toward the rear side of the liquid crystal display device 10) from respective outer edges of the frame portions. The frame portions 13a form a flat plate having a through hole in its middle portion. The frame portions 13a include an elastic layer 13c on their rear side surfaces. The elastic layer 13c is arranged along inner edge portions of the frame portions 13a so as to be in a frame shape. The bezel 13 is mounted to the chassis 14 while the elastic layer 13c of the frame portions 13a is in contact with the corresponding peripheral edge portions of the display surface 11a of the liquid crystal panel 11. The liquid crystal panel 11 is held between the plate surface (facing portion) 180a of the light guide plate 18 and the frame portions 13a of the bezel 13. Accordingly, the liquid crystal panel 11 is fixed by the plate surface (facing portion) 180a of the light guide plate 18 and the frame portions 13a of the bezel 13. The wall portions 13b of the bezel 13 forma substantially rectangular hollow shape that surrounds the wall plates 14c, 14d, 14e, 14f of the chassis 14. The wall portions 13b are fixed to the wall plates 14c and other parts of the chassis 14 with a fixing method such as screws, and accordingly, the bezel 13 is fixed to the chassis 14. As illustrated in FIG. 3, a predetermined space is maintained between a surface of each wall portion 13b of the bezel 13 that faces the wall plate 14c of the chassis 14 and the wall plate 14c. The flexible wiring board 113 having the source driver and the print board 115 are arranged between the wall plate 14c of the chassis 14 and the corresponding wall portion 13b of the bezel 13. A distal end surface (a top surface) 181a of the wall 181 of the light guide plate 18 is closely adhered to a rear surface of the frame portion 13a of the bezel 13, as illustrated in FIG. 3.

When the liquid crystal display device 10 is turned on (in an ON state), each of the LED light sources 16 arranged on the LED board 17 of the lighting device 12 emits light (is lit on). When each LED light source 16 emits light, light from the LED light source 16 enters the light guide plate 18 through the end surface (the light entrance surface) 180d of the light guide plate 18. The light entering the light guide plate 18 travels within the light guide plate 18 with reflecting off the reflection sheet 19 that is arranged on the rear side of the light guide plate 18. Then, the light exits the light guide plate 18 through the front plate surface (the light exit surface, the facing portion) 180a. The light exiting the light guide plate 18 passes through the optical sheet set 15 arranged in the recess 183 of the light guide plate 18 and reaches the rear surface 11b of the liquid crystal panel 11 arranged in the recess 183. The liquid crystal panel 11 displays images on the display surface 11a with using the light that reaches the rear surface 11b.

In the liquid crystal display device 10 according to this embodiment, the liquid crystal panel 11 is positioned by the recess 183 that is formed on a front side of the light guide plate 18. In the liquid crystal display device (the lighting device) 10, the liquid crystal panel (the display panel) 11 and the facing portion 180a of the light guide plate (the optical member) 18 are positioned by the walls 181 that rise from the peripheral edges of the facing portion 180a. The position of the end portion (the peripheral edge) of the liquid crystal panel 11 is determined (positioned) by the inner wall surface 181b of the wall 181. Therefore, the liquid crystal panel 11 is positioned in the liquid crystal display device 10 without using an exclusive member having a frame-like shape that is conventionally used for positioning the liquid crystal panel 11. Accordingly, the liquid crystal display device 10 according to this embodiment has a configuration that reduces an area of the frame edge portion. Specifically, the liquid crystal display device 10 according to this embodiment does not necessarily include any member for positioning the liquid crystal panel 11 between the wall plate 14d of the chassis 14 and the wall portion 13b of the bezel 13. Therefore, the liquid crystal display device 10 can reduce a space for at least the member for positioning the liquid crystal panel 11.

The liquid crystal display device 10 according to this embodiment includes the bezel (a frame member) 13 that faces the peripheral edge portions of the display surface 11a of the liquid crystal panel 11. The bezel 13 and the facing portion 180a hold the liquid crystal panel 11 therebetween. Such a bezel 13 and the facing portion 180a of the light guide plate 18 fix the liquid crystal panel 11.

In the liquid crystal display device 10 according to this embodiment, the optical sheet set 15 is positioned by the recess 183 arranged on the front side of the light guide plate 18. The position of the end portion 115c of the optical sheet set 15 is determined by the inner wall surface 181b of the wall 181 (positioned). Accordingly, in the liquid crystal display device 10 according to this embodiment, the liquid crystal panel 11 and the optical sheet set 15 are positioned by the recess 183 of the light guide plate 18.

In the liquid crystal display device 10 according to this embodiment, the walls 181 are formed integrally with the body 180 as a part of the light guide plate 18. The walls 181 are formed integrally with the body of the light guide plate 18, and this reduces the number of parts for the liquid crystal display device 10 and reduces the number of steps of assembling the liquid crystal display device 10.

In the liquid crystal display device 10 according to this embodiment, the liquid crystal panel 11 includes the flexible wiring boards 113 having the source drivers and the each of the flexible wiring boards 113 extends outwardly from the end portion of the liquid crystal panel 11. Each flexible wiring board 113 has a flat belt-like shape as a whole. The wall 181 has the board insertion portions 182 that are cutouts and through which the respective flexible wiring boards 113 are inserted. Since the wall 181 includes the cutout-shaped board insertion portions 182 through which the flexible wiring boards 113 are inserted, respectively, the end portion of the liquid crystal panel to which the flexible wiring boards 113 are connected is positioned by the wall 181. In this embodiment, the flexible wiring board 116 having the gate driver is shorter than the flexible wiring board 113 having the source driver. Unlike the flexible wiring boards 113 having the source drivers, no print board 115 is connected to the end portion of the flexible wiring board 116 having the gate driver. Therefore, the flexible wiring boards 116 having the gate drivers are arranged in the recess 183 of the light guide plate 18 while the end portions thereof are bent. Like the flexible wiring boards 113 having the source drivers, the wall 181 of the light guide plate 18 may have cutout portions (not illustrated) so as not to be in contact with the flexible wiring boards 116 having the gate drivers.

Second Embodiment

Figure 5:
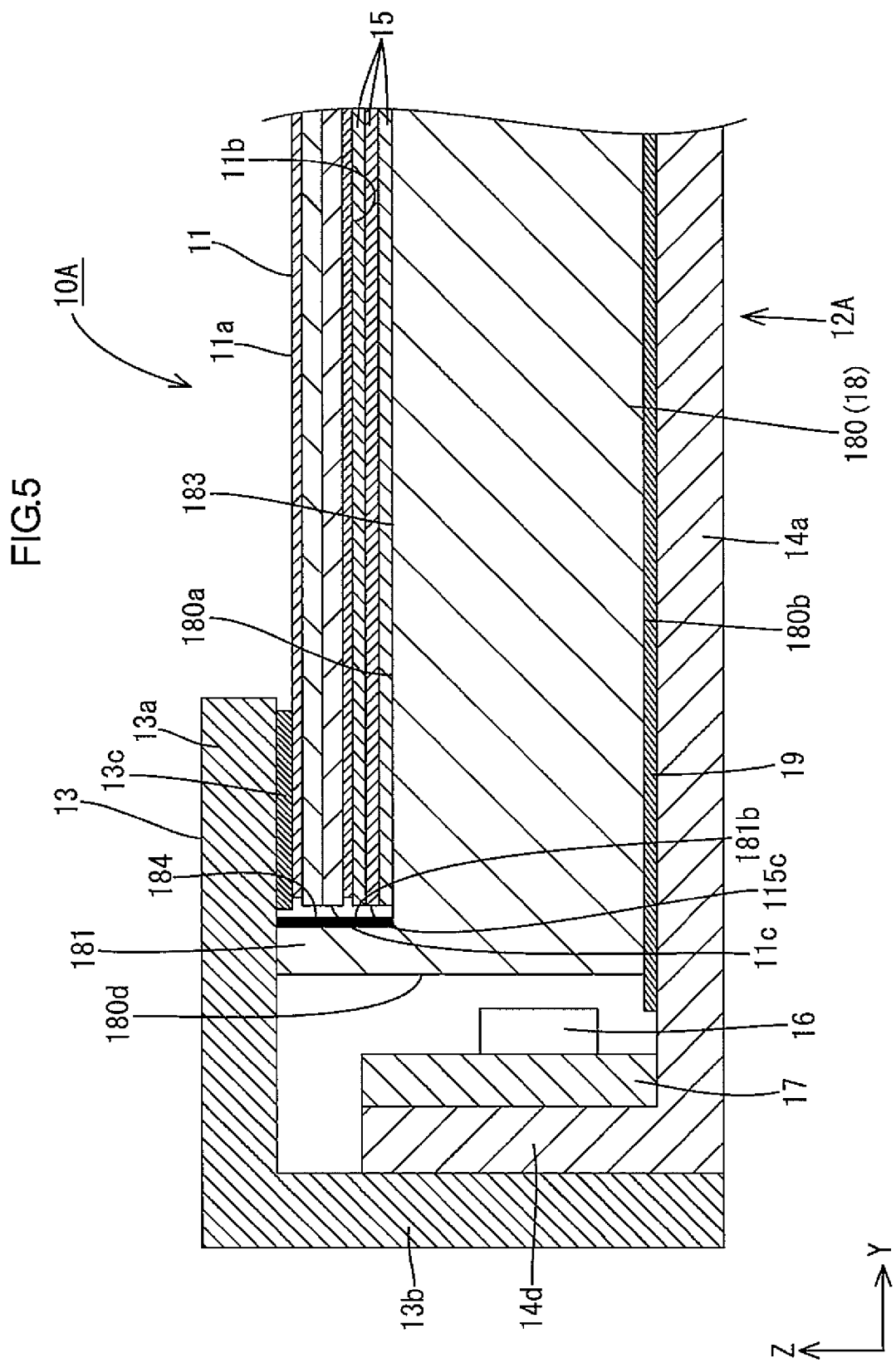
FIG. 5 is a magnified cross-sectional view of a liquid crystal display device according to a second embodiment.

A second embodiment of this invention will be described with reference to FIG. 5. The same parts as those in the first embodiment will be indicated by the same symbols and will not be explained. FIG. 5 is a magnified cross-sectional view illustrating a liquid crystal display device 10A according to the second embodiment of the present invention. A basic configuration of the liquid crystal display device 10A (a lighting device 12A) according to this embodiment is similar to that of the first embodiment. In the liquid crystal display device 10A according to this embodiment, a light blocking layer 184 is arranged on an inner wall surface 181b of the wall 181 included in the light guide plate 18. The light blocking layer 184 blocks light. The inner wall surface 181b of the wall 181 faces the end portion 11c of the liquid crystal panel 11 arranged in the recess 183. The wall 181 faces the end portion 115c of the optical sheet set 15. The light from the LED light sources 16 enter the light guide plate 18 and most of rays of the light exits the light guide plate 18 (the body 180) through the front plate surface (the facing portion) 180a toward the optical sheet set 15. However, apart of the rays of light entering the light guide plate 18 travels through inside of the wall 181 and exits through the inner wall surface 181b toward the liquid crystal panel 11 and the optical sheet set 15 arranged in the recess 183 (refer to the first embodiment). Thus, the light exiting the wall 181 may enter the liquid crystal panel 11 through the end portion 11c, and this may cause uneven brightness on the display surface 11a of the liquid crystal panel 11. The light exiting the wall 181 may enter the optical sheet set 15 through the end portion 115c, and this may cause uneven brightness on the display surface 11a of the liquid crystal panel 11 according to a type of the optical sheet set 15.

For the above reasons, in the liquid crystal display device 10A according to this embodiment, the light blocking layer 184 that is a black coating layer is disposed to cover the inner wall surface 181b of the wall 181 of the light guide plate 18.

The light blocking layer 184 is disposed on the inner wall surface 181b of the wall 181 by known printing technique. The light blocking layer 184 is disposed on the inner wall surfaces 181b of the walls 181 so as to surround the liquid crystal panel 11. With such a light blocking layer 184, the light is less likely to enter the liquid crystal panel 11 through the end portion 11c and less likely to enter the optical sheet set 15 through the end portion 115c. Accordingly, uneven brightness is less likely to be caused in the liquid crystal display device 10A.

Third Embodiment

Figure 6:
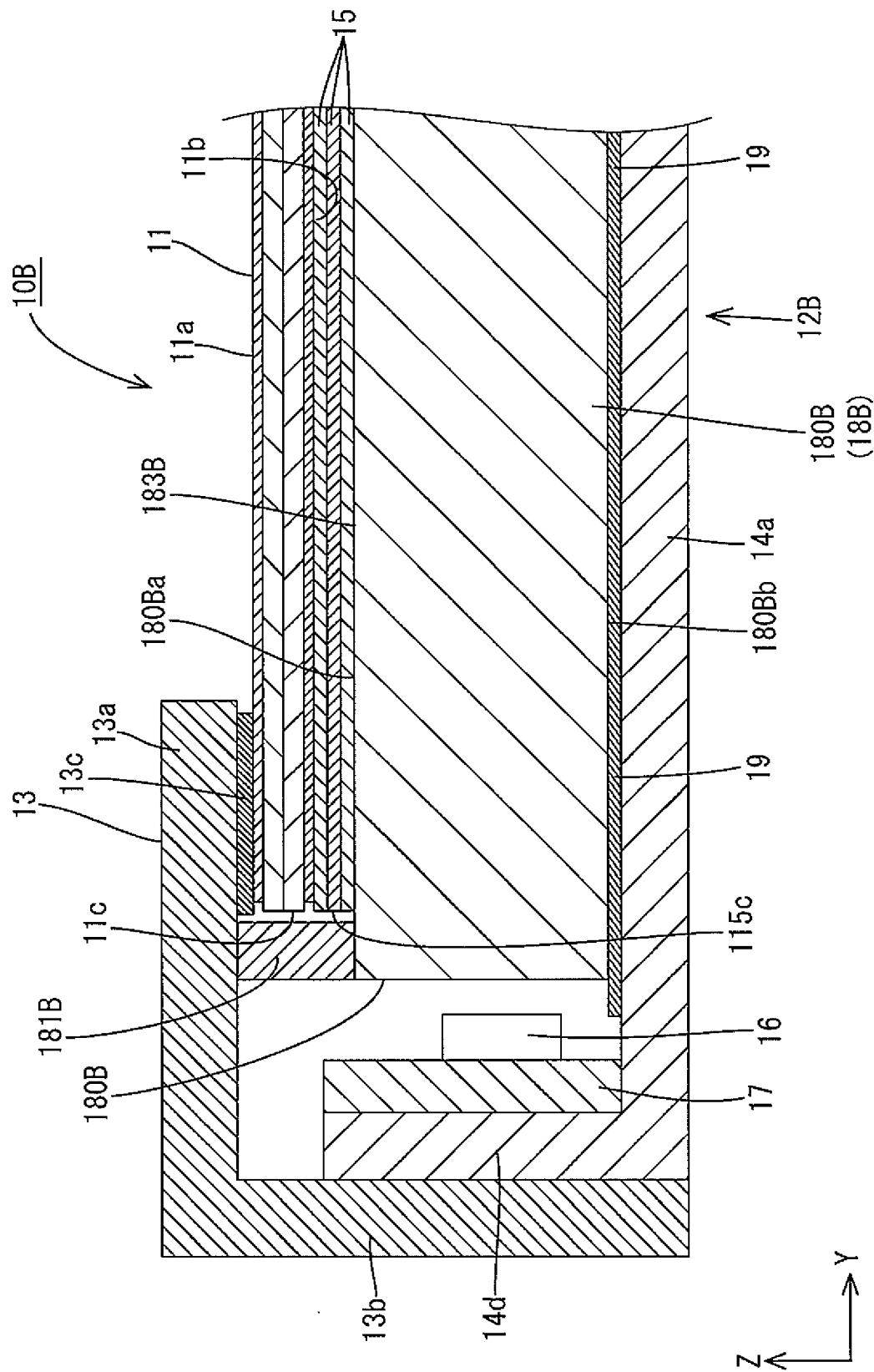
FIG. 6 is a magnified cross-sectional view of a liquid crystal display device according to a third embodiment.

A third embodiment of this invention will be described with reference to FIG. 6. FIG. 6 is a magnified cross-sectional view illustrating a liquid crystal display device 10B according to the third embodiment of the present invention. A basic configuration of the liquid crystal display device 10B (a lighting device 12B) according to this embodiment is similar to that of the first embodiment. However, in the liquid crystal display device 10B according to this embodiment, a configuration of a wall 181B included in a light guide plate 18B is different from that of the first embodiment. The wall 181B included in the light guide plate 18B according to this embodiment is formed integrally with a body 180B like the first embodiment. However, the wall 181B is made of a material different from that of the body 180B. The body 180B of the light guide plate 18B is made of the same material as the light guide plate 18 (the body 180) of the first embodiment (the material capable of high light transmission such as acrylic resin). The wall 181B included in the light guide plate 18B is made of a black resin material (a light blocking material). Such a resin material may be, for example, a material obtained by adding a black coloring agent (for example, carbon black) to the resin material forming the body 180B. The body 180B and the wall 181B of the light guide plate 18B according to this embodiment may be made of different materials with using a two-color molding technique. The walls 181B rise from respective peripheral edges of the body 180B so as to surround the liquid crystal panel 11.

In the liquid crystal display device 10B according to this embodiment, with such walls 181B, the light is less likely to enter the liquid crystal panel 11 through the end portion 11c and to enter the optical sheet set 15 through the end portion 115c. Accordingly, uneven brightness is less likely to be caused in the liquid crystal display device 10B like the second embodiment.

Fourth Embodiment

Figure 7:
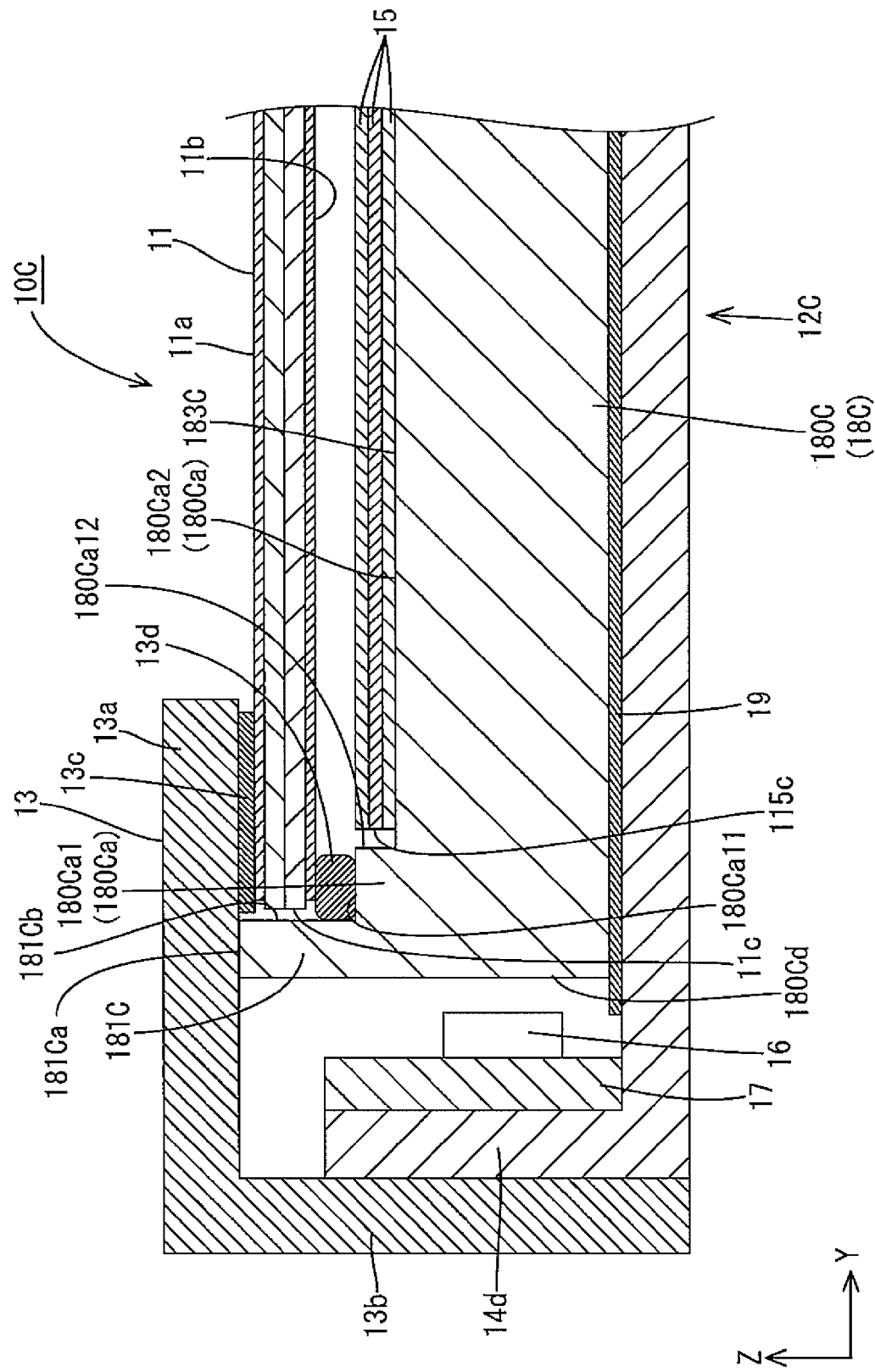
FIG. 7 is a magnified cross-sectional view of a liquid crystal display device according to a fourth embodiment.

A fourth embodiment of this invention will be described with reference to FIG. 7. FIG. 7 is a magnified cross-sectional view illustrating a liquid crystal display device 10C according to the fourth embodiment. A basic configuration of the liquid crystal display device 10C (a lighting device 12C) according to this embodiment is similar to that of the first embodiment. However, in the liquid crystal display device 10C according to this embodiment, a configuration of a recess 180C included in a light guide plate 18C is different from that of the first embodiment.

The light guide plate 18C is made of a material having high light transmission properties such as acrylic resin like that in the first embodiment and mainly includes a body 180C and walls 181C provided on a front side of the body 180C. The body 180C has a facing portion 180Ca on its front side and the facing portion 180Ca includes wall-side portions 180Ca1 and a recess portion 180Ca2. The wall-side portions 180Ca1 are provided to correspond to the peripheral edge portions of the rear surface 11b of the liquid crystal panel 11 and surround a periphery of the optical sheet set 15. The recess portion 180Ca2 is arranged on an inner side with respect to the wall-side portions 180ca1 and recessed further in a thickness direction of the light guide plate 18C with respect to the wall-side portions 180Ca1 such that the optical sheet set 15 is arranged therein. According to this embodiment, the body 180C is formed such that the front surface (facing portion) 180a of the body 180 of the first embodiment is recessed toward the rear side.

Like the first embodiment, the walls 181C rise from the front-side peripheral edge portions of the body 180C, respectively. The walls 181C are provided on an outer side with respect to the wall-side portions 180Ca1 and protruded toward the front side with respect to the wall-side portions 180Ca1. The walls 181C and the facing portion 180Ca (the wall-side portions 180ca1, the recess portion 180Ca2) define a recess 183C. The recess 183C has a further recessed portion that is recessed further to the rear side of the light guide plate 18C compared to the recess 183 of the first embodiment, and the optical sheet set 15 is arranged in the further recessed portion. A size of the optical sheet set 15 that is used in this embodiment is slightly smaller than that of the optical sheet set 15 used in the first embodiment. Namely, the optical sheet set 15 of this embodiment has a size slightly smaller than that of the liquid crystal panel 11.

The optical sheet set 15 is arranged in the further recessed portion defined by the recess portion 180Ca2 (the front plate surface of the body 180C) and inner wall surfaces 180Ca12 of the wall-side portions 180Ca1 that surround the recess portion 180Ca2. The position of the end portion 115c of the optical sheet set 15 is determined (positioned) by the inner wall surfaces 180Ca12 of the wall-side portions 180Ca1. A small clearance is provided between 115c of the optical sheet set 15 and the inner wall surface 180Ca12 of the wall-side portion 180Ca1.

The liquid crystal panel 11 is arranged in the recess 183C such that the peripheral edge portions of the rear surface 11b correspond to the end surfaces 180Ca11 of the wall-side portions 180Ca1. An elastic layer 13d is arranged between the peripheral edge portions of the rear surface 11b and the end surfaces 180Ca11. The peripheral edge portions of the rear surface 11b are put on the end surfaces 180Ca11 of the wall-side portions 180Ca1 indirectly via the elastic layer 13d. The frame portions 13a of the bezel 13 are put on the peripheral edge portions of the display surface 11a of the liquid crystal panel 11 indirectly via the elastic layer 13c. The peripheral edge portions of the liquid crystal panel 11 are held between the bezel 13 and the wall-side portions 180Ca1 of the light guide plate 18C. The position of the end portion 11c of the liquid crystal panel 11 is determined (positioned) by the inner wall surfaces 181Cb of the walls 181C. A clearance is provided between the rear surface 11b of the liquid crystal panel 11 and the optical sheet set 15.

As described before, according to the liquid crystal display device 10C of this embodiment, the facing portion 180Ca includes the wall-side portions 180Ca1 and the recess portion 180Ca2. The peripheral edge portions of the rear surface 11b of the liquid crystal panel 11 are provided to correspond to the wall-side portions 180Ca1 and the wall-side portions 180Ca1 surround the periphery of the optical sheet set 15. The recess portion 180Ca2 is further recessed in the thickness direction of the light guide plate 18C with respect to the wall-side portions 180Ca1 and the optical sheet set 15 is arranged in the recess portion 180Ca1. The recess portion 180Ca2 is provided such that the clearance is provided between the rear surface 11b of the liquid crystal panel 11 and the optical sheet set 15. With such a configuration, deflection is less likely to be caused on the optical sheet set 15 even if the optical sheet set 15 thermally expands or shrinks. According to this embodiment, the optical sheet set 15 is positioned by the wall-side portions 180Ca1. However, the optical sheet set 15 is not held between the light guide plate 18C and the bezel 13. Therefore, if the optical sheet set 15 thermally expands or shrinks, the optical sheet set 15 can moves in its surface direction (a vertical direction with respect to the thickness direction) without being rubbed by the rear surface 11b of the liquid crystal panel 11. Accordingly, in the liquid crystal display device 10C of this embodiment, unevenness is less likely to occur in brightness and display quality due to the deflection of the optical sheet set 15.

In the liquid crystal display device 10C of this embodiment, the wall-side portions 180Ca1 determines the position of the end portion 115c of the optical sheet set 15 with having a clearance between the wall-side portions 180Ca1 and the end portion 115c of the optical sheet set 15. With such a configuration of the wall-side portions 180Ca1, if the optical sheet set 15 thermally expands or shrinks and the end portion 115c of the optical sheet set 15 moves toward the outer side, the end portion 115c of the optical sheet set 15 is pushed back by the wall-side portions 180Ca1. Accordingly, the deflection is less likely to be caused in the optical sheet set 15. According to this embodiment, even if the end portion 115c of the optical sheet set 15 moves toward the outer side, the deflection is less likely to be caused in the optical sheet set 15 due to the clearance since the end portion 115c can move within a space of the clearance before coming in contact with the inner wall surface 180Ca12 of the wall-side portion 180Ca1.

Fifth Embodiment

Figure 8:
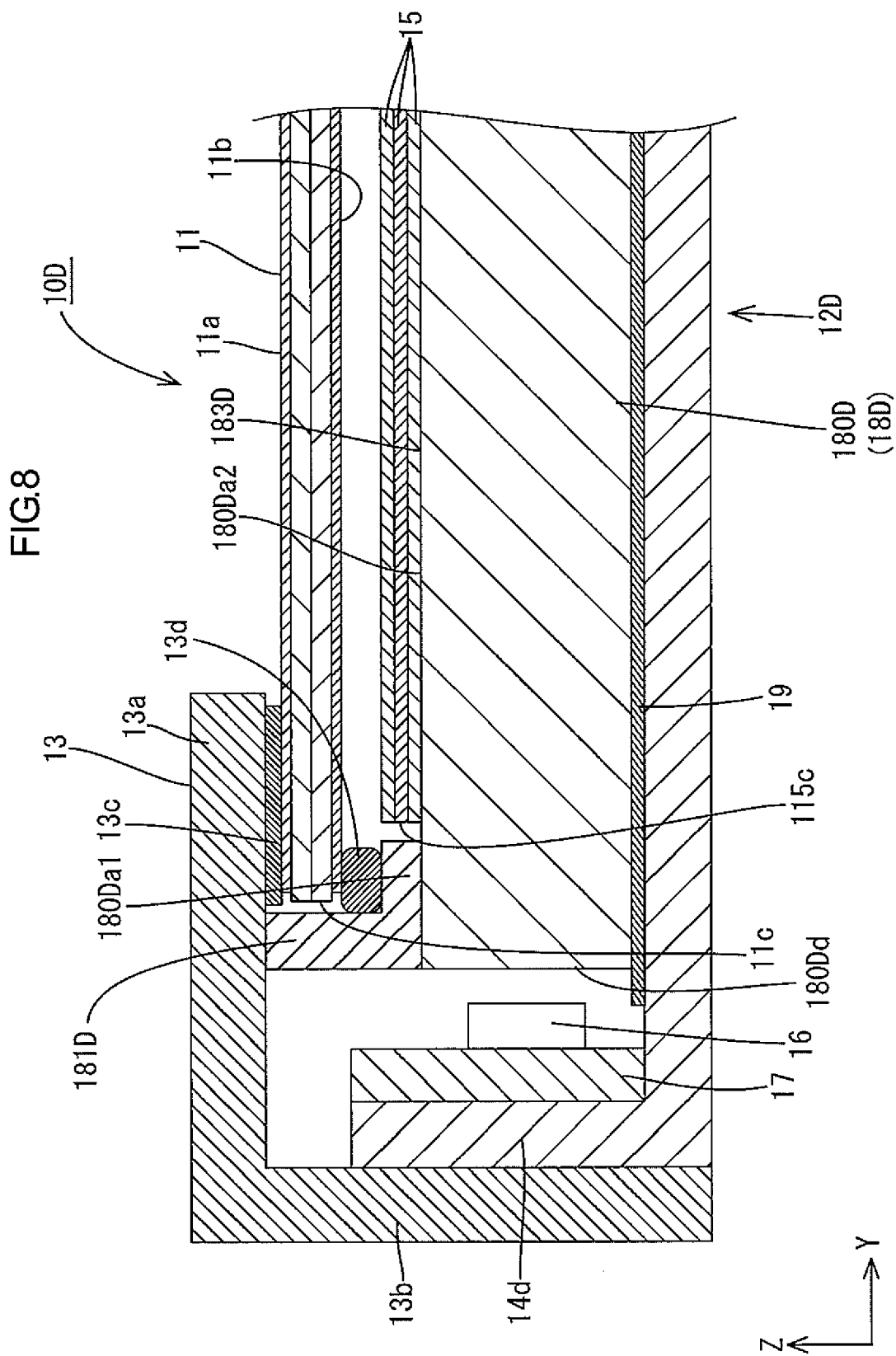
FIG. 8 is a magnified cross-sectional view of a liquid crystal display device according to a fifth embodiment.

A fifth embodiment of this invention will be described with reference to FIG. 8. FIG. 8 is a magnified cross-sectional view illustrating a liquid crystal display device 10D according to the fifth embodiment. A basic configuration of the liquid crystal display device 10D (a lighting device 12D) according to this embodiment is similar to that of the fourth embodiment. However, in the liquid crystal display device 10D according to this embodiment, walls 181D and wall-side portions 180Da1 of a light guide plate 18D are formed of a light blocking material. The light blocking material used for the walls 181D and the wall-side portions 180Da1 are same as those used for the walls 181B of the third embodiment. The walls 181D and the wall-side portions 180Da1 are integrally formed with each other. With such a configuration of the light guide plate 18D including the walls 181D and the wall-side portions 180Da1, light is less likely to enter the liquid crystal panel 11 from the end portion 11c or the optical sheet set 15 from the end portion 115c. Accordingly, in the liquid crystal display device 10D, unevenness in brightness is less likely to occur similar to the second and third embodiments.

Sixth Embodiment

Figure 9:
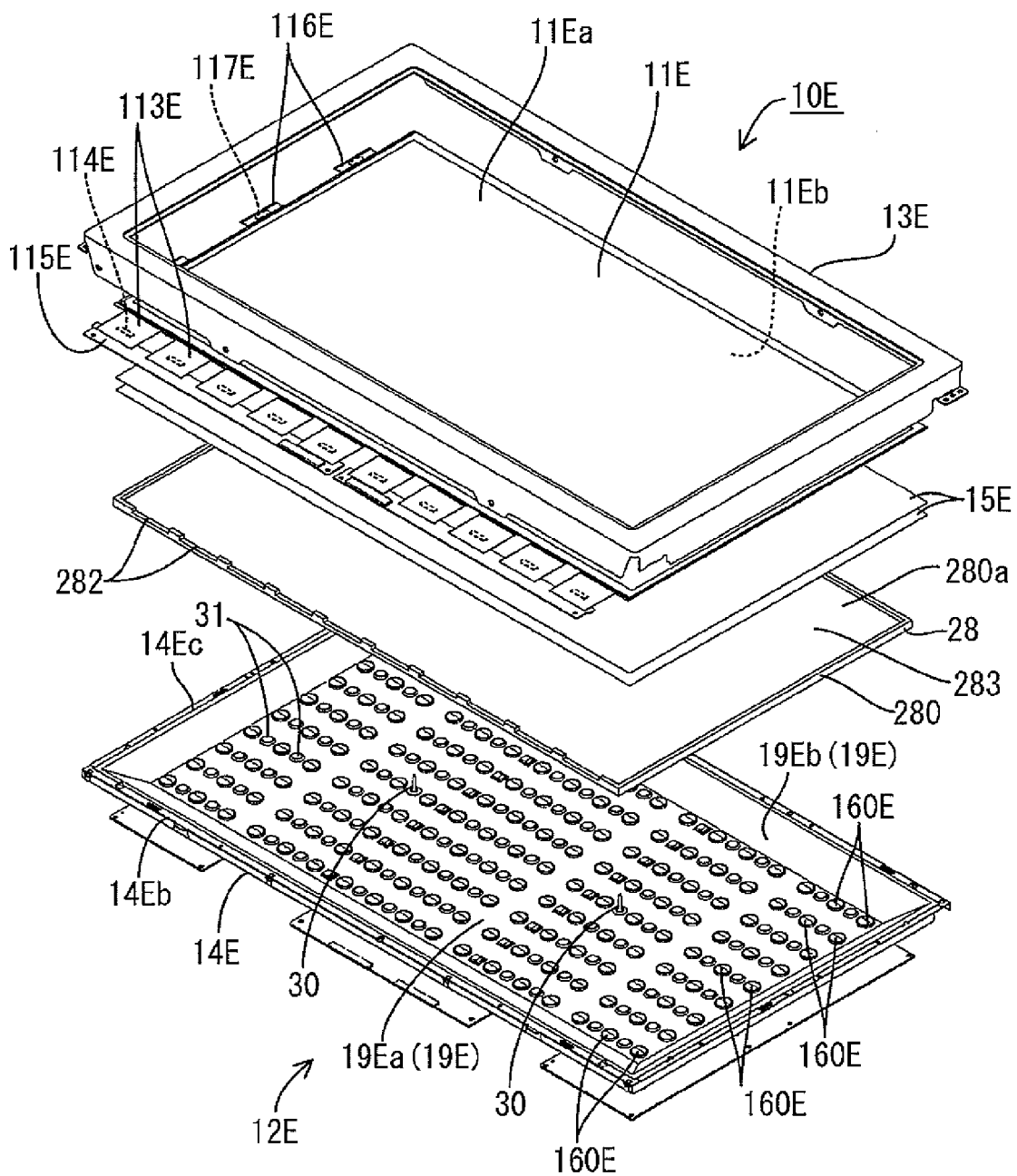
FIG. 9 is an exploded perspective view illustrating a general configuration of a liquid crystal display device according to a sixth embodiment.
Figure 10:
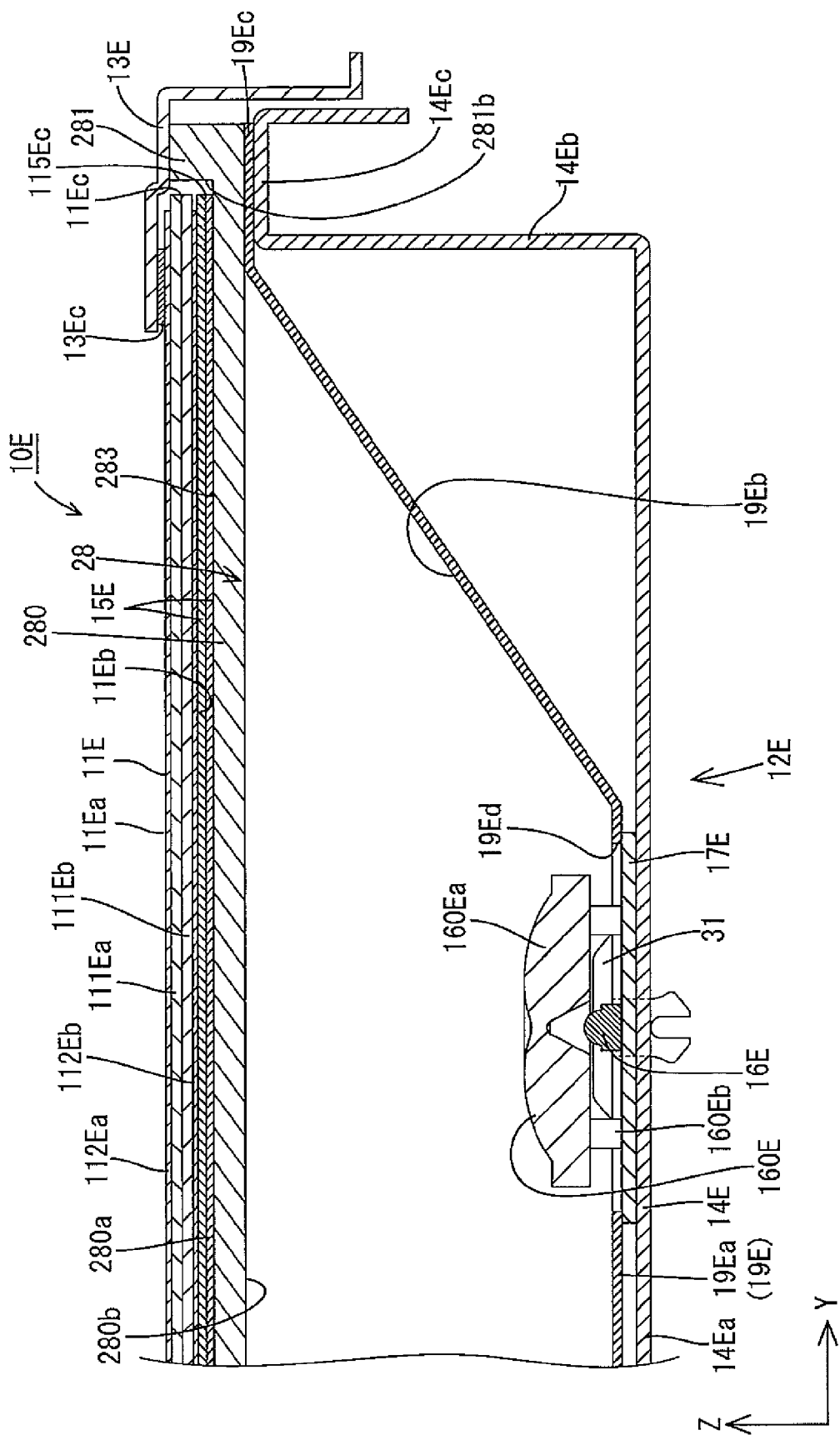
FIG. 10 is a magnified cross-sectional view of a liquid crystal display device according to a sixth embodiment.

A sixth embodiment of the present invention will be described with reference to FIGS. 9 and 10. According to this embodiment, a liquid crystal display device 10E including a direct-type lighting device 12E will be described. FIG. 9 illustrates an exploded perspective view illustrating an overall configuration of a liquid crystal display device and FIG. 10 illustrates a magnified cross-sectional view illustrating a liquid crystal display device 10E according to the sixth embodiment.

The liquid crystal display device 10E of this embodiment includes the direct type lighting device 12E. The liquid crystal display device 10E includes LED light sources 16E on a rear surface 11Eb side with respect to a liquid crystal panel 11E. The lighting device 12E of this embodiment mainly includes a chassis 14E, an LED board 17E, the LED light sources 16E, a reflection sheet 19E, a diffuser plate (an optical member) 28, and optical sheets 15E. The liquid crystal display device 10E includes the lighting device 12E, a liquid crystal panel 11E, and a bezel 13E.

The chassis 14E as a whole has a box-like shape having an opening on its front side and is made of a metal material such as aluminum. The chassis 14E includes a bottom plate 14Ea having a landscape rectangular shape, wall plates 14Eb rising from peripheral edge portions of the bottom plate 14Ea, and receiving plates 14Ec each extending outwardly from an end of the wall 14Eb. A plurality of elongated LED boards 17E are arranged on and fixed to the bottom plate 14Ea of the chassis 14E so as to be parallel to each other. The LED boards 17E are fixed to the bottom plate 14Ea with fixing members 31 of a rivet-like shape. A plurality of LED light sources 16E are mounted on each of the LED boards 17E. The LED light sources 16E are arranged such that a light axis of each LED light source 16E is directed to the front side of the liquid crystal display device 10E. A diffuser lens 160E is arranged above each LED light source 16E. Light emitting from the LED light source 16E transmits through the diffuser lens 160E and travels toward the front side of the liquid crystal display device 10E. The diffuser lens 160E includes a lens main body 160Ea covering the LED light source 16E and leg portions 160Eb that extend from the lens main body 160Ea toward the LED board 17E and are fixed by the LED board 17E.

A reflection sheet 19E is disposed inside the chassis 14E. The reflection sheet 19E is processed to be in a container shape having an opening on its front side. The reflection sheet 19E includes a bottom portion 19Ea, side surface portions, 19Eb, and extended portions 19Ec. The bottom portion 19Ea has a landscape rectangular shape covering the bottom plate 14Ea of the chassis 14E. The side surface portions 19Eb rise from peripheral edge portions of the bottom portion 19Ea so as to be inclined to expand outwardly. The extended portions 19Ec extends outwardly from respective ends of the side surface portions 19Eb. The extended portions 19Ec are disposed on the respective receiving plates 14Ec of the chassis 14. The bottom portion 19Ea has lens insertion holes 19Ed through which the respective LED light sources 16E covered with the diffuser lenses 160Ea are fitted.

A diffuser plate 28 that is an optical member is arranged above (on the opening side) the LED light sources 16E in the chassis 14E. The diffuser plate 28 is a plate member having a rectangular parallelepiped shape as a whole. Light entering the diffuser plate 28 from its rear side travels within the diffuser plate with being diffused and exits the diffuser plate 28 toward the front side. The diffuser plate 28 includes a body 280 having a plate shape and wall portions 281 rising from the body 280. The body 280 has a front side plate surface 280a that faces a rear surface 11Eb of the liquid crystal panel 11E. The light emitted from the LED light sources 16E exit the diffuser plate 28 through the plate surface 280a toward the rear surface 11Eb of the liquid crystal panel 11E. According to this embodiment, the plate surface 280a corresponds to a facing portion 280a. The wall portions 281 rise from respective peripheral edge portions of the plate surface (the facing portion) 280a. According to this embodiment, the wall portions 281 and the body 280 are made of a same material and formed integrally with each other as one part. The wall portions 281 and the plate surface (the facing portion) 280a of the body 280 define a recessed portion that is a recess 283 where the liquid crystal panel 11E and the optical sheets 15E are arranged. The optical sheets 15E are placed directly on the facing portion 280a so as to cover the facing portion 280a.

A basic configuration of the liquid crystal panel 11E is similar to that of the first embodiment. Similar to the first embodiment, according to this embodiment, the liquid crystal panel 11E includes a CF board 111Ea and a TFT array board 111Eb that are bonded to each other having a liquid crystal layer therebetween. Similar to the first embodiment, a pair of polarizing plates 112Ea, 112Eb is arranged to sandwich the boards 111Ea, 111Eb.

The bezel 13E has a frame shape and is formed of metal. The bezel 13E is mounted to the liquid crystal display device 10E so as to face the peripheral edge portions of the display surface 11Ea of the liquid crystal panel 11E. The bezel 13E is placed on the peripheral edge portions of the display surface 11Ea via an elastic layer therebetween. The liquid crystal panel 11E is fixed in the liquid crystal display device 10E while the peripheral edge portions of the liquid crystal panel 11E are held between the bezel and the facing portion 280a of the diffuser plate 28. The position of the end portion 11Ec of the liquid crystal panel 11E and the position of the end portions 115Ec of the optical sheets 14E are determined (positioned) by the wall portions 281.

In the liquid crystal display device 10E of this embodiment, when the LED light sources 16E included in the lighting device 12E are lit on, light emitted from the LED light sources 16E passes through the diffuser lens 160E and travels toward the rear plate surface 280b of the diffuser plate 28. The light that reached the rear plate surface 280b of the diffuser plate 28 enters the diffuser plate 280 through the plate surface 280b. Then, the light travels through the diffuser plate 280 with being diffused and exits the diffuser plate 280 from the facing portion 280a and travels toward the optical sheets 15E. The light travels through the optical sheets 15E and reaches the rear surface 11Eb of the liquid crystal panel 11E. The liquid crystal panel 11E displays images on the display surface 11Ea with using the light reaching the rear surface 11Eb.

In the liquid crystal display device 10E of this embodiment, as described before, the liquid crystal panel 11E is positioned by the recess 283 that is formed on the front side of the diffuser plate 28. In the liquid crystal display device (the display device) 10E, the liquid crystal panel (the display panel) 11E and the facing portion 280a of the diffuser plate (the optical member) 28 are positioned by the wall portions 281 that rise from the respective peripheral edge portions of the facing portion 280a. Especially, the end portions (peripheral edges) 11E of the liquid crystal panel 11E are positioned by the inner wall surfaces of the wall portions 281. Therefore, in the liquid crystal display device 10E, similar to the first embodiment, the liquid crystal panel 11E is positioned without using an exclusive frame-shape member that has been conventionally used to position the liquid crystal panel 11E. Accordingly, the liquid crystal display device 10E of this embodiment has a configuration that reduces an area of the frame edge portions. Specifically, the liquid crystal display device 10E does not necessarily include any member for positioning the liquid crystal panel 11E between the wall plate 14Eb of the chassis 14E and the bezel 13E. Therefore, the liquid crystal display device 10E can reduce a space for at least the part for positioning the liquid crystal panel.

The liquid crystal display device 10E according to this embodiment includes the bezel (the frame member) 13E that faces the peripheral edge portions of the display surface 11Ea of the liquid crystal panel 11E and holds the liquid crystal panel 11E with the facing portion 280a. The liquid crystal panel 11E is fixed with using the facing portion 280a of the diffuser plate 28a and the bezel 13E.

In the liquid crystal display device 10E according to this embodiment, the optical sheets 15E are positioned by the recess 283 formed on the front side of the diffuser plate 28. The position of the end portions 115Ec of the optical sheets 115E is determined by the inner wall surface of the wall 281 (positioned). Accordingly, in the liquid crystal display device 10E according to this embodiment, the liquid crystal panel 11E and the optical sheets 15E are positioned by the recess 283 of the diffuser plate 28.

In the liquid crystal display device 10E according to this embodiment, the walls 281 are formed integrally with the body 280 as a part of the diffuser plate 28. The walls 181 are formed integrally with the body of the light guide plate 18, and this reduces the number of parts for the liquid crystal display device 10E and reduces the number of steps of assembling the liquid crystal display device 10E.

In the liquid crystal display device 10E according to this embodiment, the liquid crystal panel 11E includes the flexible wiring boards 113E having the source drivers and the each of the flexible wiring boards 113E extends outwardly from the end portion of the liquid crystal panel 11E. Each flexible wiring board 113E has a flat belt-like shape as a whole. The wall 281 has the wiring board passages 282 that are cutouts and through which the respective flexible wiring boards 113E are inserted. Since the walls 281 include the cutout-shaped wiring board passages 282 through which the flexible wiring boards 113E are inserted, respectively, the end portion of the liquid crystal panel 11E to which the flexible wiring boards 113E are connected is positioned by the wall 281. In this embodiment, the flexible wiring board 116E having the gate driver is shorter than the flexible wiring board 113E having the source driver. Unlike the flexible wiring boards 113E having the source drivers, no print board 115E is connected to the end portion of the flexible wiring board 116E having the gate driver. Therefore, the flexible wiring boards 116E having the gate drivers are arranged in the recess 283 of the diffuser plate 28 while the end portions thereof are bent. Like the flexible wiring boards 113E having the source drivers, the wall 281 of the diffuser plate 28 may have cutout portions (not illustrated) so as not to be in contact with the flexible wiring boards 116E having the gate drivers.

Seventh Embodiment

Figure 11:
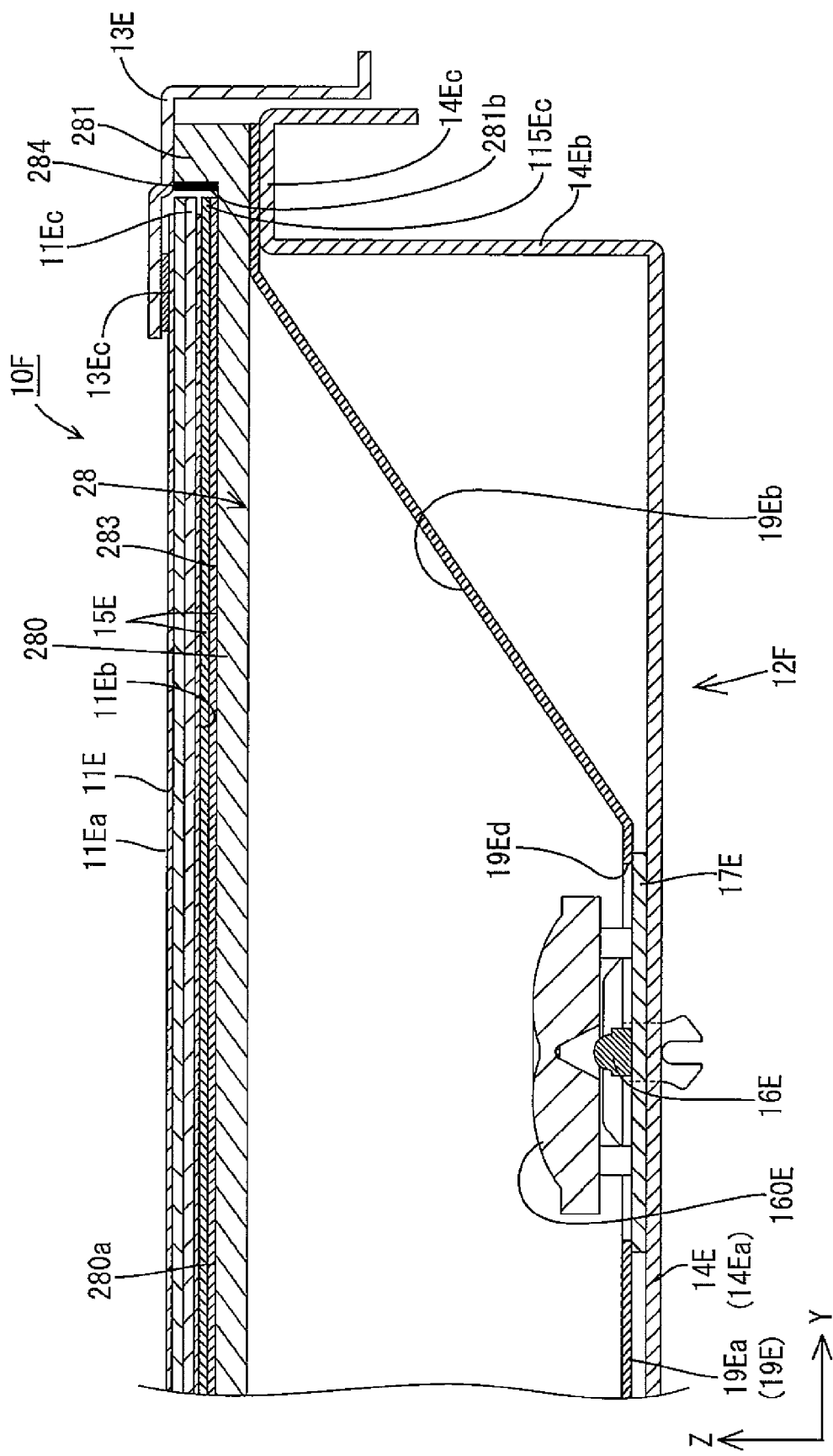
FIG. 11 is a magnified cross-sectional view of a liquid crystal display device according to a seventh embodiment.

A seventh embodiment of this invention will be described with reference to FIG. 11. FIG. 11 is a magnified cross-sectional view illustrating a liquid crystal display device 10F according to the seventh embodiment of the present invention. A basic configuration of the liquid crystal display device 10F (a lighting device 12F) according to this embodiment is similar to that of the sixth embodiment. According to this embodiment, a light blocking layer 284 is arranged on an inner wall surface 281b of the wall 281 included in the diffuser plate 28. The light blocking layer 284 is made of a same material as the light blocking layer 184. According to this embodiment, the light blocking layer 284 is disposed on the inner wall surfaces 281b of the walls 281 so as to surround the end portions 11Ec of the liquid crystal panel 11E and the end portions 115Ec of the optical sheets 15E. With such a light blocking layer 284 included in the diffuser plate 28, the light is less likely to enter the liquid crystal panel 11E through the end portion 11Ec and less likely to enter the optical sheets 15E through the end portions 115Ec. Accordingly, uneven brightness is less likely to be caused in the liquid crystal display device 10F.

Eighth Embodiment

An eighth embodiment of this invention will be described with reference to FIG. 12. FIG. 12 is a magnified cross-sectional view illustrating a liquid crystal display device 10G according to the eighth embodiment of the present invention. A basic configuration of the liquid crystal display device 10G (a lighting device 12G) according to this embodiment is similar to that of the sixth embodiment. The liquid crystal display device 10G according to this embodiment includes a recess 283G formed on a front side of a diffuser plate 28G that has a configuration different from that of the sixth embodiment.

The diffuser plate 28G is made of a material same as that of the sixth embodiment, and mainly includes a body 280G and walls 281G provided on a front side with respect to the body 280G. The body 280G includes a facing portion 280Ga on its front side and the facing portion 280Ga includes wall-side portions 280Ga1 and a recess portion 280dGa2. The wall-side portions 280Ga1 are placed on respective peripheral edge portions of the rear surface 11Eb of the liquid crystal panel 11E to surround a periphery of the optical sheets 15E. The recess portion 280Ga2 is provided on an inner side with respect to the wall-side portions 280Ga1 and recessed further in the thickness direction of the diffuser plate 28G with respect to the wall-side portions 280Ga1. The optical sheets 15E are arranged in the recess portion 280Ga2. The body 280G of this embodiment is formed such that a front side plate surface (a facing portion) 280a of the body 280 of the sixth embodiment is recessed toward the rear side.

The walls 281G rise from the respective front-side peripheral edge portions of the body 280G. The walls 281G are provided on an outer side with respect to the wall-side portions 280Ga1 and protrude toward the front side with respect to the wall-side portions 280Ga1. The recess portion 283G is defined by the walls 281G and the facing portion 280Ga (the wall-side portions 280Ga1, the recess portion 280Ga1. The recess portion 283G includes a further recessed portion where the optical sheets 15E are arranged. The further recessed portion is further recessed toward the rear side of the diffuser plate 28G compared to the recess 283 of the sixth embodiment. A size of the optical sheets 15E that are used in this embodiment is slightly smaller than that of the optical sheets 15 used in the first embodiment. Namely, the optical sheets 15E of this embodiment have a size slightly smaller than that of the liquid crystal panel 11E.

The optical sheets 15E are arranged in a recessed portion that is defined by the recess portion 280Ga2 (a front-side plate surface of the body 280G) and inner wall surfaces of the wall-side portions 280Ga1 that surround a periphery of the recess portion 280Ga2. The position of the end portions 115Ec of the optical sheets 15E is determined (positioned) by the inner wall surfaces of the wall-side portions 280Ga1. A small clearance is provided between 115Ec of the optical sheets 15E and the inner wall surface of the wall-side portion 280Ga1.

The liquid crystal panel 11E is arranged in the recess 283G such that the peripheral edge portions of the rear surface 11Eb correspond to the end surfaces of the wall-side portions 280Ga1. An elastic layer 13Ed is arranged between the peripheral edge portions of the rear surface 11Eb and the end surfaces. The peripheral edge portions of the rear surface 11Eb are put on the end surfaces of the wall-side portions 280Ga1 indirectly via the elastic layer 13Ed. The frame portions of the bezel 13 are put on the peripheral edge portions of the display surface 11Ea of the liquid crystal panel 11E indirectly via the elastic layer 13Ec. The peripheral edge portions of the liquid crystal panel 11E are held between the bezel 13E and the wall-side portions 280Ca1 of the diffuser plate 18G. The position of the end portion 11Ec of the liquid crystal panel 11E is determined (positioned) by the inner wall surfaces of the walls 281G. A clearance is provided between the rear surface 11Eb of the liquid crystal panel 11E and the optical sheets 15E.

As described before, according to the liquid crystal display device 10G of this embodiment, the facing portion 280Ga includes the wall-side portions 280Ga1 and the recess portion 280Ga2. The peripheral edge portions of the rear surface 11Eb of the liquid crystal panel 11E are provided to correspond to the wall-side portions 280Ga1 and the wall-side portions 280Ga1 surround the periphery of the optical sheets 15E. The recess portion 280Ga2 is further recessed in the thickness direction of the light guide plate 28G with respect to the wall-side portions 280Ga1 and the optical sheets 15E are arranged in the recess portion 280Ga1. The recess portion 280Ga2 is provided such that the clearance is provided between the rear surface 11Eb of the liquid crystal panel 11E and the optical sheets 15E. With such a configuration, deflection is less likely to be caused on the optical sheets 15E even if the optical sheets 15E thermally expand or shrink. According to this embodiment, the optical sheets 15E are positioned by the wall-side portions 280Ga1. However, the optical sheets 15E are not held between the diffuser plate 28C and the bezel 13E. Therefore, if the optical sheets 15E thermally expand or shrink, the optical sheets 15E can moves in their surface direction (a vertical direction with respect to the thickness direction) without being rubbed by the rear surface 11b of the liquid crystal panel 11. Accordingly, in the liquid crystal display device 10G of this embodiment, unevenness is less likely to occur in brightness and display quality due to the deflection of the optical sheets 15E.

In the liquid crystal display device 10G of this embodiment, the wall-side portions 280Ga1 determines the position of the end portions 115E of the optical sheets 15E with having a clearance between the wall-side portions 280Ga1 and the end portions 115Ec of the optical sheets 15E. With such a configuration of the wall-side portions 280Ga1, if the optical sheets 15E thermally expand or shrink and the end portions 115Ec of the optical sheets 15E move toward the outer side, the end portions 115Ec of the optical sheets 15E are pushed back by the wall-side portions 280Ga1. Accordingly, the deflection is less likely to be caused in the optical sheets 15E. According to this embodiment, even if the end portions 115Ec of the optical sheets 15E move toward the outer side, the deflection is less likely to be caused in the optical sheets 15E due to the clearance since the end portions 115Ec can move within a space of the clearance before coming in contact with the inner wall surface 280Ga12 of the wall-side portion 280Ga1.

In the liquid crystal display device 10G according to this embodiment, the walls 281G and the wall-side portions 280Ga1 of the diffuser plate 28G are formed of a light blocking material. With such walls 281G and the wall-side portions 280Ga1 included in the diffuser plate 28G, the light is less likely to enter the liquid crystal panel 11E through the end portion 11Ec and less likely to enter the optical sheets 15E through the end portions 115Ec. Accordingly, uneven brightness is less likely to be caused in the liquid crystal display device 10G of this embodiment (see the fifth embodiment).

Other Embodiments

The present invention is not limited to the above embodiments explained in the above description and the drawings. The technology described herein may include the following embodiments.

(1) In the above embodiments, the liquid crystal display device includes the optical sheet. However, the liquid crystal display device may not include any optical sheets.

(2) In the fourth embodiment, the light blocking layer may be provided on the surfaces of the walls and the surfaces of the wall-side portions of the light guide plate. Accordingly, the light may be less likely to enter the liquid crystal panel through the end portion thereof and less likely to enter the optical sheets through the end portion thereof.

(3) In the second embodiment or other embodiments, the light blocking layer is formed with using a known printing technique. However, for example, a light blocking layer made of a film material may be adhered to inner wall surfaces of walls.

(4) In the above embodiments, the LED light sources are used as the light source. However, a light source other than the LED light sources may be used.

(5) In addition to the above embodiments, the number or the arrangement of the LED boards or the number or the arrangement of the LEDs may be altered if necessary.

(6) In the above embodiments, the display device is arranged in a vertical position such that the short-side direction of the liquid crystal panel and the chassis match the vertical direction. However, the display device may be arranged in a vertical position such that the long-side direction of the liquid crystal panel and the chassis match the vertical direction.

(7) In the above embodiments, the TFTs are used as switching components of the liquid crystal display device. However, the technology described herein may be applied to liquid crystal display devices including a liquid crystal display panel using switching components other than TFTs (e.g., thin film diodes (TFDs)). Furthermore, the technology may be applied to a liquid crystal display device including a black-and-white liquid crystal display panel other than a liquid crystal display device including a color liquid crystal display panel.

(8) In the above embodiments, the liquid crystal display device including the liquid crystal panel is used as a display panel. However, the technology can be applied to display devices including other types of display panels.

(9) In the above embodiments, the television device includes the tuner. However, the technology can be applied to display devices without including a tuner.

EXPLANATION OF SYMBOLS

10: liquid crystal display device (display device), 11: liquid crystal panel (display panel), 11a: display surface, 11b: rear surface, 12: lighting device (backlight unit), 13: bezel (frame member), 14: chassis, 15: optical sheet set, 16: LED light source (light source), 17: LED bard (light source bard), 18: light guide plate (optical member), 180: body, 180a: facing portion, 181: wall, 19: reflection sheet, TV: television device

The invention claimed is:

1. A display device comprising:
a light source;
a display panel including a rear surface that light from the light source reaches, and a display surface that is opposite to the rear surface and displays an image using the light reaching the rear surface;
an optical member having a plate shape and including a facing portion that faces the rear surface, and through which the light from the light source transmits and which the light exits from the facing portion toward the rear surface; and
a wall rising from a peripheral edge portion of the facing portion and surrounding a periphery of the display panel; wherein
the wall has an inner wall surface on a display panel side, and the display device further comprising a light blocking layer that covers the inner wall surface and blocks light.

2. The display device according to claim 1, further comprising a frame member that faces a peripheral edge portion of the display surface and holds the display panel with the facing portion.

3. The display device according to claim 1, further comprising an optical sheet arranged between the facing portion and the rear surface and through which the light exiting the facing portion transmits toward the rear surface.

4. The display device according to claim 1, wherein the wall is made of a light blocking material that blocks light.

5. The display device according to claim 1, wherein the wall is formed integrally with the optical member.

6. The display device according to claim 1, wherein
the display panel includes a flexible board that extends from an end portion of the display panel toward an outer side, and
the wall has a board insertion portion having a cutout shape to which the flexible board is inserted.

7. The display device according to claim 1, wherein
the light source is arranged to face an end surface of the optical member, and
the optical member is a light guide plate, and the light from the light source enters the light guide plate through the end surface and exits the light guide plate from the facing portion.

8. The display device according to claim 1, wherein
the light source is arranged to face a plate surface of the optical member that is opposite to the facing portion, and
the optical member is a diffuser plate, and the light from the light source enters the diffuser plate through the plate surface and exits the diffuser plate from the facing portion.

9. A television device including the display device according to claim 8.

10. The display device according to claim 1, wherein the display panel is a liquid crystal panel including a pair of substrates and liquid crystals that are enclosed between the substrates.

11. A display device comprising:
a light source;
a display panel including a rear surface that light from the light source reaches, and a display surface that is opposite to the rear surface and displays an image using the light reaching the rear surface;
an optical member having a plate shape and including a facing portion that faces the rear surface, and through which the light from the light source transmits and which the light exits from the facing portion toward the rear surface;
a wall rising from a peripheral edge portion of the facing portion and surrounding a periphery of the display panel; and
an optical sheet arranged between the facing portion and the rear surface and through which the light exiting the facing portion transmits toward the rear surface, wherein the facing portion includes a wall-side portion and a recess portion, the wall-side portion is provided corresponding to peripheral edge portion of the rear surface and to surround a periphery of the optical sheet, and the recess portion is provided on an inner side with respect to the wall-side portion and recessed further in a thickness direction of the optical member with respect to the wall-side portion and houses the optical sheet therein.

12. The display device according to claim 11, wherein the recess portion is set to provide a clearance between the rear surface and the optical sheet.

13. The display device according claim 11, wherein the wall-side portion is set to provide a clearance between an end portion of the optical sheet and the wall-side portion.

14. The display device according to claim 11, wherein the wall-side portion and the wall are formed integrally with each other and formed of a light blocking material that blocks light.

* * * * *